(12) United States Patent
Iijima

(10) Patent No.: US 11,092,570 B2
(45) Date of Patent: Aug. 17, 2021

(54) MAGNETIC BODY INSPECTION APPARATUS AND MAGNETIC BODY INSPECTION METHOD

(71) Applicant: Shimadzu Corporation, Kyoto (JP)

(72) Inventor: Kenji Iijima, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 60 days.

(21) Appl. No.: 16/480,889

(22) PCT Filed: Jan. 26, 2017

(86) PCT No.: PCT/JP2017/002830
§ 371 (c)(1),
(2) Date: Jul. 25, 2019

(87) PCT Pub. No.: WO2018/138850
PCT Pub. Date: Aug. 2, 2018

(65) Prior Publication Data
US 2019/0360965 A1    Nov. 28, 2019

(51) Int. Cl.
*G01N 27/83* (2006.01)
(52) U.S. Cl.
CPC .................. *G01N 27/83* (2013.01)
(58) Field of Classification Search
CPC ....................................... G01N 27/83
USPC ........................................ 324/240
See application file for complete search history.

(56) References Cited

U.S. PATENT DOCUMENTS

| 3,359,495 A * | 12/1967 | McMaster .......... G01N 27/9006 324/235 |
| 4,659,991 A | 4/1987 | Weischedel |
| 6,366,085 B1 * | 4/2002 | Yeshurun .............. G01N 27/83 324/235 |
| 6,501,267 B1 * | 12/2002 | Kurokawa ........... G01N 27/904 324/242 |
| 9,869,729 B1 * | 1/2018 | Ausserlechner .... G01R 33/0094 |
| 2008/0126882 A1 * | 5/2008 | Fulton .................. G05B 19/058 714/48 |
| 2011/0006762 A1 | 1/2011 | Yoshioka et al. |
| 2013/0147471 A1 | 6/2013 | Weischedel |
| 2015/0002144 A1 * | 1/2015 | Boecker ............. G01N 27/9026 324/240 |

(Continued)

FOREIGN PATENT DOCUMENTS

| JP | S55-135976 U | 3/1979 |
| JP | S54-104888 A | 8/1979 |

(Continued)

OTHER PUBLICATIONS

Zhu, H. and Yu, F., 2016. A cross-correlation technique for vehicle detections in wireless magnetic sensor network. IEEE Sensors Journal, 16(11), pp. 4484-4494. (Year: 2016).*

(Continued)

*Primary Examiner* — Christopher P McAndrew
(74) *Attorney, Agent, or Firm* — Morgan, Lewis & Bockius LLP

(57) ABSTRACT

This magnetic body inspection apparatus (100, 200, 300, 400) includes a magnetic field application unit (1) configured to apply a magnetic field in advance to a steel wire rope (W) and to adjust a magnetization direction of the steel wire rope (W), and is configured to detect a magnetic field change by a detector (2).

18 Claims, 12 Drawing Sheets

(56) References Cited

U.S. PATENT DOCUMENTS

| | | | |
|---|---|---|---|
| 2015/0066391 A1* | 3/2015 | Wang | G01N 27/83 702/38 |
| 2017/0023347 A1 | 1/2017 | Ouellette | |

FOREIGN PATENT DOCUMENTS

| | | | |
|---|---|---|---|
| JP | S57-166557 A | | 10/1982 |
| JP | S58-115385 A | | 7/1983 |
| JP | S62-108149 A | | 5/1987 |
| JP | 62223652 A | * | 10/1987 |
| JP | 2556957 Y | | 12/1997 |
| JP | H10-332542 A | | 12/1998 |
| JP | H11-030607 A | | 2/1999 |
| JP | 2000-351575 A | | 12/2000 |
| JP | 2001-153845 A | | 6/2001 |
| JP | 2002-257789 A | | 9/2002 |
| JP | 2003-050230 A | | 2/2003 |
| JP | 2003-302379 A | | 10/2003 |
| JP | 2003-322640 A | | 11/2003 |
| JP | 2005-162379 A | | 6/2005 |
| KR | 10-2016-0141803 A | | 12/2016 |

OTHER PUBLICATIONS

Office Action issued in corresponding Korean Patent Application No. 10-2019-7018329 dated May 11, 2020.
Extended European Search Report issued in corresponding European Patent Application No. 17894543.2 dated Aug. 10, 2020.
Jomdecha et al., "Design of modified electromagnetic main-flux for steel wire rope inspection," NDT&E International 42: 77-83 (2009).
Office Action issued in counterpart Japanese Patent Application No. 2018-564029 dated Jul. 28, 2020.
International Search Report issued in corresponding International Patent Application No. PCT/JP2017/002830 dated Apr. 18, 2017.
Written Opinion issued in corresponding International Patent Application No. PCT/JP2017/002830 dated Apr. 18, 2017.
Kokado et al., "Non-speed electromagnetic flaw detection of steel cords," Japan Mining Journal, 94, 1081 (1978).
Wire rope integrity diagnosis, www.tokyobridge.co.jp/maintenance/index.html (2015).

* cited by examiner

FIRST EMBODIMENT

FIG.10
(SECOND EMBODIMENT)
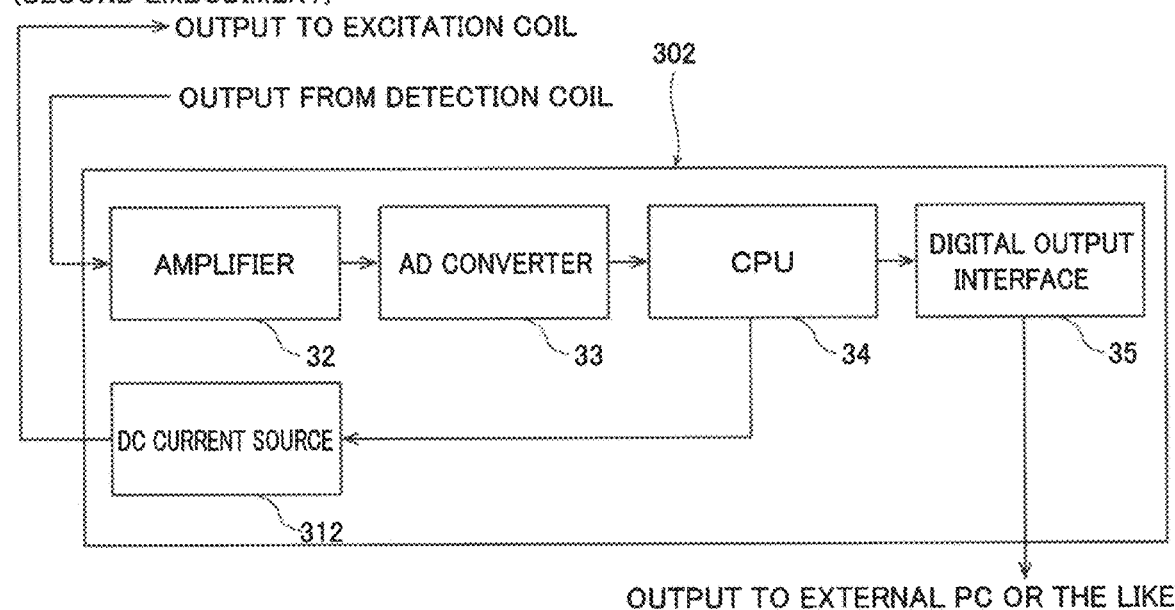
FIG.11
(THIRD EMBODIMENT)
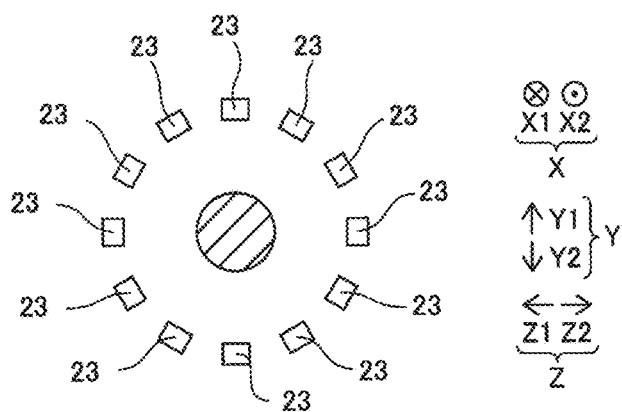
(a)
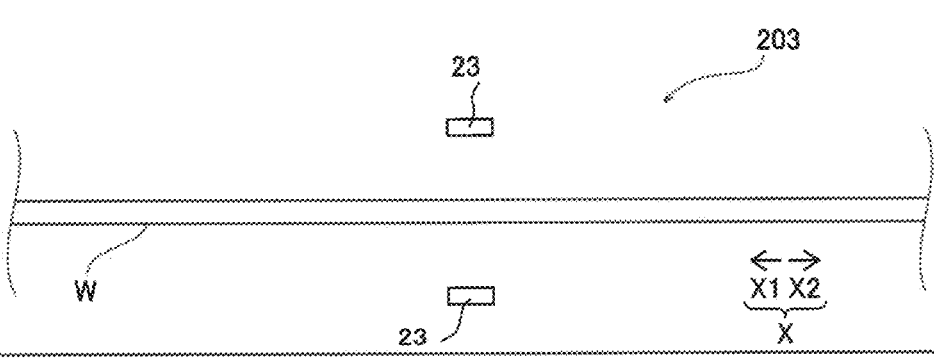
(b)

(FOURTH EMBODIMENT)

FIG.14
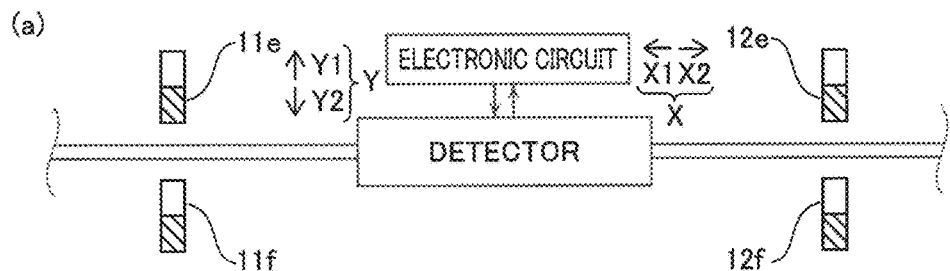
(a)
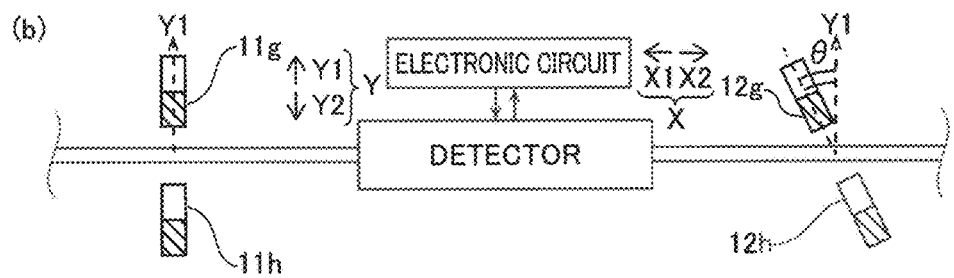
(b)
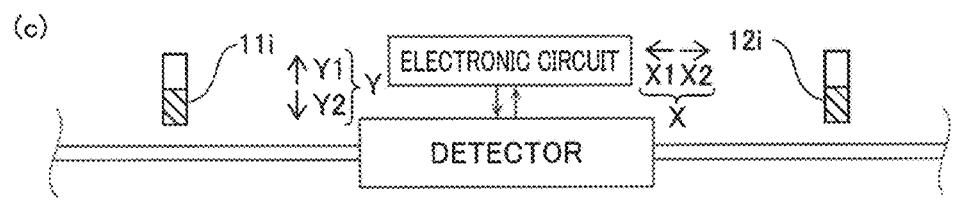
(c)
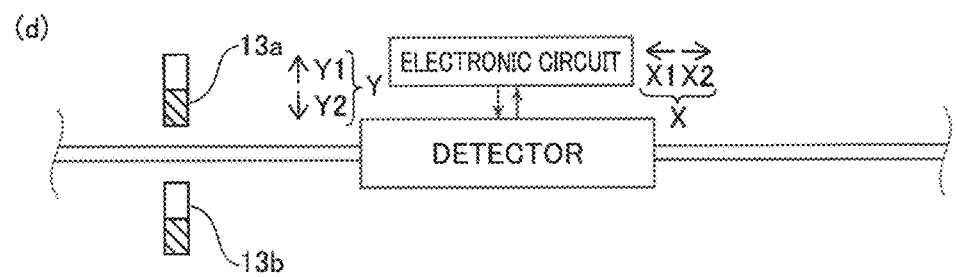
(d)
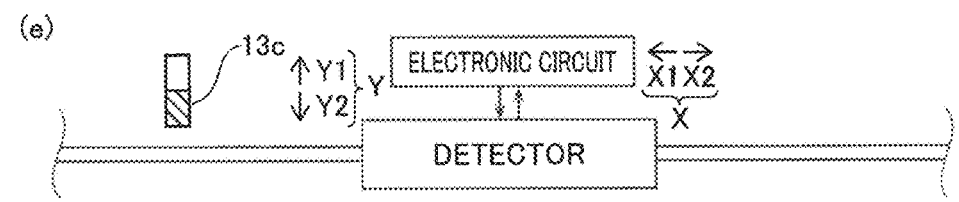
(e)

MAGNETIC BODY INSPECTION APPARATUS AND MAGNETIC BODY INSPECTION METHOD

TECHNICAL FIELD

The present invention relates to a magnetic body inspection apparatus and a magnetic body inspection method, and more particularly, it relates to a magnetic body inspection apparatus including a detector configured to detect the magnetic field of a magnetic body and a magnetic body inspection method.

BACKGROUND ART

Conventionally, a magnetic body inspection apparatus including a detector configured to detect the magnetic field of a magnetic body is known. Such a magnetic body inspection apparatus is disclosed in Japanese Patent Laid-Open No. 2003-302379, for example.

Japanese Patent Laid-Open No. 2003-302379 discloses a wire rope breakage detection apparatus (magnetic body inspection apparatus) including a coil holder provided on the outer periphery of a longitudinally extending steel wire rope (magnetic body) so as to be movable relative to the steel wire rope, and an excitation coil (detector) and detection coils (detector) wound around the outer periphery of the coil holder along a direction in which the steel wire rope extends with the steel wire rope as a center. The excitation coil (detector) is configured to apply a magnetic field to the steel wire rope in the longitudinal direction of the steel wire rope. Furthermore, the detection coil (detector) is configured to detect leakage magnetization in the longitudinal direction of the steel wire rope arising from the steel wire rope and output a detection signal. In addition, the wire rope breakage detection apparatus is configured to detect the leakage of the magnetic field generated at a position at which the steel wire rope is broken by relatively moving a sensor holder and the steel wire rope in the longitudinal direction, and warn a user of the breakage of the steel wire rope.

PRIOR ART

Patent Document
Patent Document 1: Japanese Patent Laid-Open No. 2003-302379

SUMMARY OF THE INVENTION

Problems to be Solved by the Invention

However, in the wire rope breakage detection apparatus (magnetic body inspection apparatus) disclosed in Japanese Patent Laid-Open No. 2003-302379, noise due to variations in the magnetization of the steel wire rope (magnetic body) is detected. Specifically, a magnetization direction inside a magnetic body such as the steel wire rope may not be aligned in a fixed direction at the time of manufacture (after manufacture). Furthermore, the magnetization direction inside the magnetic body is also changed by application of a stress, bending, or the like when the magnetic body passes through a pulley or the like, resulting in non-uniformity. Therefore, even in a uniform portion in which the steel wire rope is not broken, the detection coil (detector) may detect a signal based on the noise due to the variations in the magnetization direction of the steel wire rope. In such a case, there is a problem that it is not possible to easily determine the state (the presence or absence of a flaw or the like) of the magnetic body.

The present invention has been proposed in order to solve the aforementioned problems, and an object of the present invention is to provide a magnetic body inspection apparatus and a magnetic body inspection method capable of easily determining the state (the presence or absence of a flaw or the like) of a magnetic body.

Means for Solving the Problems

In order to attain the aforementioned object, a magnetic body inspection apparatus according to a first aspect of the present invention includes a magnetic field application unit configured to apply a magnetic field in advance to a magnetic body to be inspected and to adjust a magnetization direction of the magnetic body, a detector configured to output a detection signal in accordance with a magnetic field of the magnetic body or a variation in the magnetic field of the magnetic body after the magnetic field application unit applies the magnetic field to the magnetic body, and a determiner configured to determine a magnetic state of the magnetic body based on the detection signal output from the detector.

As described above, the magnetic body inspection apparatus according to the first aspect of the present invention includes the detector configured to output the detection signal in accordance with the magnetic field of the magnetic body or the variation in the magnetic field of the magnetic body after the magnetic field application unit applies the magnetic field to the magnetic body in advance, and the determiner configured to determine the magnetic state of the magnetic body based on the detection signal output from the detector. Accordingly, the magnetic field is applied to the magnetic body in advance, and thus the magnetization of a uniform portion (a portion without a flaw or the like) of the magnetic body is substantially adjusted. On the other hand, the magnetic field of a portion with a flaw or the like of the magnetic body is not adjusted. Consequently, the detection signal output from the detector is different between the portion with a flaw or the like and the portion without a flaw or the like such that the determiner can easily determine the state (the presence or absence of a flaw or the like) of the magnetic body.

In the present invention, a "flaw or the like" of the magnetic body indicates a wider concept including portions in which a cross-sectional area variation in a detection direction occurs due to rubbing of, local wear, wire breakage, a dent, corrosion, a crack, breakage, etc. of the magnetic body (including one due to a void when a flaw or the like occurs inside the magnetic body), portions in which a permeability change occurs due to rust of the magnetic body, welding burn of the magnetic body, mixing of impurities into the magnetic body, composition change of the magnetic body, etc., and other non-uniform portions of the magnetic body. Furthermore, a variation in the magnetic field includes a wider concept including a temporal variation in the magnitude of the magnetic field detected by the detector due to relative movement of the magnetic body and the detector and a temporal variation in the magnitude of the magnetic field detected by the detector due to a temporal variation in the magnetic field applied to the magnetic body. In addition, the term "intersect" is not limited to being orthogonal, but includes intersecting diagonally.

In the aforementioned magnetic body inspection apparatus according to the first aspect, the magnetic field application unit is preferably configured to apply a magnetic field in a first direction in advance to the magnetic body to be inspected and to adjust the magnetization direction of the magnetic body, the detector is preferably configured to detect at least one of a magnetic field of the magnetic body in a second direction that intersects with a first direction and a variation in the magnetic field of the magnetic body in the second direction after the magnetic field application unit applies a magnetic field in the first direction to the magnetic body, and to output a detection signal in accordance with the magnetic field of the magnetic body in the second direction or the variation in the magnetic field of the magnetic body in the second direction, which has been detected, and the determiner is preferably configured to determine the magnetic state of the magnetic body based on the detection signal output from the detector. According to this configuration, the magnetic field is applied in advance in the first direction that intersects with the second direction, which is a detection direction in which the magnetic field or the variation in the magnetic field is detected, to the magnetic body, and thus the magnetization of the uniform portion (the portion without a flaw or the like) of the magnetic body is adjusted substantially in the first direction. Consequently, the magnetic field in the second direction is reduced as compared with the case in which a magnetic field is not applied in advance in the first direction. That is, variations in the magnetization magnitude and the magnetization direction are reduced and the magnetization direction is in a direction that intersects with the detection direction, and thus generation of noise due to the variations can be significantly reduced or prevented. Consequently, it is possible to easily determine the state (the presence or absence of a flaw or the like) of the magnetic body.

In this case, the magnetic body is preferably made of an elongated material, the magnetic field application unit is preferably configured to apply a magnetic field in a direction that intersects with a longitudinal direction of the elongated material, and the detector is preferably configured to detect a magnetic field of the magnetic body made of the elongated material in the second direction that intersects with the first direction or a variation in the magnetic field of the magnetic body made of the elongated material in the second direction. According to this configuration, the magnetic field is applied in the short-side direction (the direction that intersects with the longitudinal direction), and thus as compared with the case in which the magnetic field is applied in the relatively long longitudinal direction, the magnetization of the magnetic body is reduced, and the magnetization direction is in the direction that intersects with the detection direction of the detector. Thus, noise is further reduced, and thus the state (the presence or absence of a flaw or the like) of the magnetic body can be more easily determined.

In the aforementioned magnetic body inspection apparatus in which the magnetic body is made of the elongated material, the magnetic field application unit is preferably spaced apart from the detector in the second direction in which the elongated material extends such that a magnetic field output therefrom does not affect detection by the detector. When a relative position between the detector and the magnetic field application unit changes, noise is generated in the magnetic field detected by the detector. In addition, the noise increases as a distance between the detector and the magnetic field application unit decreases. Therefore, the magnetic field application unit is spaced apart to such an extent that detection of the magnetic field in the detector is not affected such that the accuracy of the S/N ratio of the detection signal is increased. Consequently, it is possible to significantly reduce or prevent generation of noise caused by a variation in the relative position between the detector and the magnetic field application unit.

In this case, the magnetic field application unit preferably includes a first magnetic field application unit configured to apply a magnetic field in the first direction to the magnetic body made of the elongated material, and a second magnetic field application unit provided on a side of the detector opposite to the first magnetic field application unit in the second direction and configured to apply a magnetic field in a direction parallel to a plane that intersects with the second direction to the magnetic body made of the elongated material. According to this configuration, when the variation in the magnetic field in the second direction is detected by relatively moving the magnetic field application unit and the magnetic body to one side or the other side in the second direction, the magnetization direction of the magnetic body can be adjusted in the first direction by the magnetic field application unit before the magnetic field is detected by the detector even when the magnetic field application unit and the magnetic body are relatively moved to any of one side and the other side in the second direction.

In the aforementioned magnetic body inspection apparatus in which the magnetic body is made of the elongated material, the detector preferably includes a detection coil that surrounds the magnetic body made of the elongated material as a center, the detection coil being wound along a direction in which the magnetic body extends and being configured to detect the variation in the magnetic field of the magnetic body in the second direction and to generate the detection signal, and the determiner is preferably configured to determine a magnetic state of the magnetic body made of the elongated material based on the detection signal. According to this configuration, the detection coil generates a voltage due to the total magnetic flux or a variation in the total magnetic flux inside a closed curve formed by a wire of the detection coil wound along the direction in which the magnetic body extends, and thus a variation in the magnetic field of the magnetic body in the second direction can be easily detected.

In this case, the detection coil preferably includes a differential coil, and the determiner is preferably configured to determine the magnetic state of the magnetic body made of the elongated material based on a difference between magnitudes of detection signals generated by two coil portions included in the differential coil due to the magnetic field in the second direction. According to this configuration, a difference between the detection signals generated by one coil portion and the other coil portion of the differential coil due to a flaw or the like of the magnetic body is detected such that a local variation in the state (the presence or absence of a flaw or the like) of the magnetic body can be more easily detected.

In the aforementioned magnetic body inspection apparatus according to the first aspect, the determiner is preferably configured to output one or more threshold signals indicating that the detection signal output from the detector exceeds one or more predetermined thresholds to an outside when the detection signal exceeds the one or more predetermined thresholds. According to this configuration, a portion in which the state (the presence or absence of a flaw or the like) of the magnetic body is non-uniform can be easily determined based on the threshold signals. In the present invention, the magnetization direction of the magnetic body is adjusted in the first direction, and thus noise is unlikely to be generated in detection of the magnetic field in the second direction, and the S/N ratio is improved. Therefore, even when a determination is made with the thresholds, an erroneous determination can be made less likely to occur.

In this case, the predetermined thresholds preferably include a first threshold and a second threshold, which is larger than the first threshold, and the determiner is preferably configured to output a first threshold signal indicating that the detection signal output from the detector exceeds the first threshold to the outside when the detection signal exceeds the first threshold, and to output a second threshold signal indicating that the detection signal output from the detector exceeds the second threshold to the outside when the detection signal exceeds the second threshold. According to this configuration, the magnetic state of the magnetic body having a small flaw or the like that requires attention such as follow-up observation can be determined based on the first threshold signal indicating that the detection signal exceeds the relatively small first threshold, and the magnetic state of the magnetic body having a relatively large flaw or the like that requires immediate replacement, for example, can be determined based on the second threshold signal indicating that the detection signal exceeds the relatively small second threshold.

In the aforementioned magnetic body inspection apparatus according to the first aspect, the determiner is preferably configured to count a number of times the detection signal output from the detector exceeds one or more predetermined thresholds, and to output a signal indicating that the number of times that has been counted exceeds a predetermined number of times to an outside when the number of times that has been counted exceeds the predetermined number of times. According to this configuration, the state of deterioration of the magnetic body, for example, can be determined based on the number of flaws or the like.

In the aforementioned magnetic body inspection apparatus in which the magnetic body is made of the elongated material, the detector preferably further includes an excitation coil configured to excite a magnetization state of the magnetic body, and is preferably configured to detect a magnetic field in the second direction of the magnetic body, the magnetization state of which has been excited due to a magnetic field generated by an excitation current that flows through the excitation coil, or a variation in the magnetic field in the second direction of the magnetic body. According to this configuration, the magnetization state of the portion with a flaw or the like of the magnetic body is excited by the excitation coil, and thus the magnetic field in the second direction or the variation in the magnetic field in the second direction of the portion with a flaw or the like of the magnetic body can be easily detected. Especially when a time-varying excitation is applied to the magnetization state of the magnetic body by supplying an alternating current or the like to the excitation coil, the magnetic field of the magnetic body also changes over time. Therefore, the magnetic field to be detected by the detector can be changed and detected without relatively moving the magnetic body and the detector.

In this case, the magnetic field applied to the magnetic body by the magnetic field application unit is preferably larger than the magnetic field generated by the excitation coil to excite the magnetization state of the magnetic body. The magnetization direction of the magnetic body is adjusted in the first direction by the large magnetic field applied in advance by the magnetic field application unit, and thus even when the magnetic field required to excite the magnetization state in the second direction in determination of the magnetic state of the magnetic body is smaller than the magnetization applied in the first direction, the magnitude is sufficient for detection. That is, as compared with the case in which the magnetization direction is not adjusted in the first direction, the magnitude of the magnetic field required to excite the magnetization state can be reduced.

In the aforementioned magnetic body inspection apparatus in which the magnetic body is made of the elongated material, if necessary, the detector is configured to detect the magnetic field of the magnetic body in the second direction at a detection position of the detector or a variation in the magnetic field of the magnetic body in the second direction at the detection position of the detector when the magnetic body is moved relative to the detector in the second direction. According to this configuration, a portion of the magnetic body in which the magnetic field is detected by the detector changes with the relative movement, and thus it is possible to easily detect a flaw or the like by comparing the portion with the flaw or the like with the portion without the flaw or the like.

In the aforementioned magnetic body inspection apparatus according to the first aspect, the detector preferably includes at least one magnetic sensor element configured to detect the magnetic field of the magnetic body or the variation in the magnetic field of the magnetic body. According to this configuration, unlike the case in which the detector includes a coil that allows the magnetic body to passes therethrough, restrictions on the size or the installation situation of the magnetic body are relaxed, and the application range is expanded.

In the aforementioned magnetic body inspection apparatus according to the first aspect, the magnetic body preferably includes a wire configured to move at least one of an X-ray irradiator configured to irradiate a subject with X-rays and an X-ray detector configured to detect the X-rays transmitted through the subject, both of which are provided in an X-ray imaging apparatus and are movable relative to the subject, and the detector is preferably configured to detect a magnetic field of the wire in the second direction. According to this configuration, the state (the presence or absence of a flaw or the like) of the wire used in the X-ray imaging apparatus can be easily determined.

In order to attain the aforementioned object, a magnetic body inspection method according to a second aspect of the present invention includes applying a magnetic field in advance in a first direction to a magnetic body to be inspected, adjusting a magnetization direction of the magnetic body, detecting a magnetic field of the magnetic body in a second direction that intersects with the first direction or a variation in the magnetic field of the magnetic body in the second direction after applying the magnetic field to the magnetic body in the first direction, outputting a detection signal in accordance with the magnetic field of the magnetic body or the variation in the magnetic field of the magnetic body that has been detected, and determining a magnetic state of the magnetic body.

In the magnetic body inspection method according to the second aspect of the present invention, as described above, a detector configured to detect at least one of the magnetic field of the magnetic body in the second direction that intersects with the first direction and the variation in the magnetic field of the magnetic body in the second direction after a magnetic field application unit applies a magnetic field in the first direction to the magnetic body, and to output a detection signal in accordance with the magnetic field of the magnetic body in the second direction or the variation in the magnetic field of the magnetic body in the second direction, which has been detected is provided. Accordingly, the magnetic field is applied in advance in the first direction that intersects with the second direction, which is a detection direction in which the magnetic field or the variation in the magnetic field is detected, to the magnetic body, and thus the magnetization of a uniform portion (a portion without a flaw or the like) of the magnetic body is adjusted substantially in the first direction. Consequently, the magnetic field in the second direction is reduced as compared with the case in which a magnetic field is not applied in advance in the first direction. That is, variations in the magnetization magnitude and the magnetization direction are reduced and the magnetization direction is in a direction that intersects with the detection direction, and thus generation of noise due to the variations can be significantly reduced or prevented. Consequently, it is possible to easily determine the state (the presence or absence of a flaw or the like) of the magnetic body.

Effect of the Invention

According to the present invention, as described above, it is possible to easily determine the state (the presence or absence of a flaw or the like) of the magnetic body.

BRIEF DESCRIPTION OF THE DRAWINGS

FIG. 10 is a block diagram showing an electronic circuit according to the second embodiment of the present invention.

FIG. 11 is a diagram illustrating an excitation coil and magnetic sensor elements according to the third embodiment of the present invention.

FIG. 14 is a diagram illustrating a magnetic field application unit according to a modified example of the first to third embodiments of the present invention.

MODES FOR CARRYING OUT THE INVENTION

Embodiments embodying the present invention are hereinafter described on the basis of the drawings.

First Embodiment

The configuration of an inspection apparatus 100 according to a first embodiment is now described with reference to FIGS. 1 to 9. In the first embodiment, an example in which the inspection apparatus 100 is used to inspect a steel wire rope W built in a mobile X-ray imaging apparatus (round-visit car) 900 is described.

Figure 1:
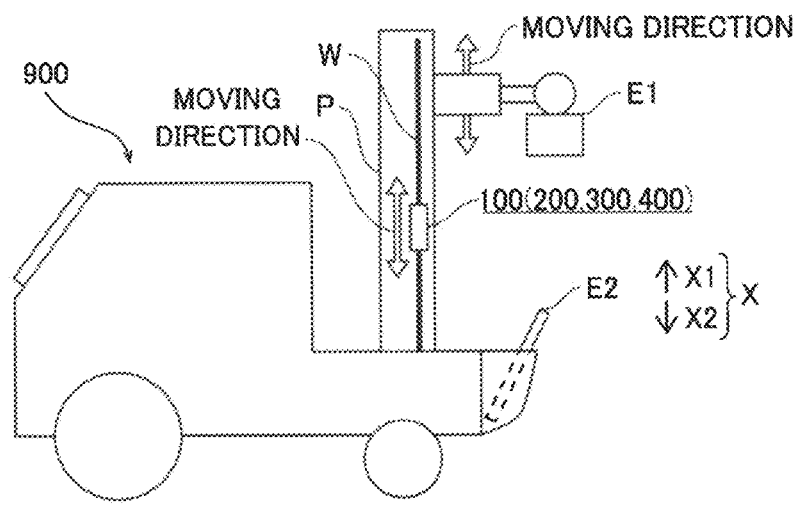
FIG. 1 is a diagram showing the overall configuration of a mobile X-ray fluoroscope including a magnetic body inspection apparatus according to first to third embodiments of the present invention.

As shown in FIG. 1, the mobile X-ray imaging apparatus 900 includes an X-ray irradiator E1 movable up and down (X direction) with respect to a pillar P, and a portable X-ray detector E2, and is movable with wheels. The X-ray irradiator E1 irradiates a subject with X-rays. The X-ray detector E2 detects the X-rays transmitted through the subject and receives an X-ray image. The X-ray irradiator E1 and the X-ray detector E2 respectively include an X-tube and a flat panel detector (FPD), for example. Furthermore, the steel wire rope W that pulls and supports the X-ray irradiator E1 and the inspection apparatus 100 movable in an upward-downward direction (X direction) in which the steel wire rope W extends are built in the pillar P. The steel wire rope W is examples of a "magnetic body", a "long material", and a "wire" in the claims.

The steel wire rope W is a magnetic body made of an elongated material formed by braiding (strand braiding, for example) a magnetic wire material and that extends in the X direction. Although illustration is omitted, the steel wire rope W passes through a mechanism such as a pulley when the X-ray irradiator E1 is moved, and a stress is applied to the steel wire rope W by the pulley or the like. In order to prevent the X-ray irradiator E1 from falling due to cutting of the steel wire rope W resulting from its deterioration, it is necessary to regularly monitor the state (the presence or absence of a flaw or the like) of the steel wire rope W and to replace the deteriorated steel wire rope W early.

As shown to FIG. 3(a), the inspection apparatus 100 is configured to detect a variation in the magnetic field (magnetic flux) of the steel wire rope W. The inspection apparatus 100 includes an inspection unit U (see FIG. 2) including a magnetic field application unit 1, a detector 2, and an electronic circuit 3, all of which are provided on a frame F, and a driver (not shown) and a drive (not shown) that allow the inspection unit U to move with respect to the steel wire rope W. A Y direction and a Z direction are two directions orthogonal to each other in a plane perpendicular to the direction in which the steel wire rope W extends. The electronic circuit 3 is an example of a "determiner" in the claims.

The magnetic field application unit 1 is configured to apply a magnetic field in the Y direction in advance to the steel wire rope W to be inspected so as to adjust the magnetization direction of the magnetic body. Furthermore, the magnetic field application unit 1 include first magnetic field application units 11a and 11b that apply a magnetic field in a Y2 direction to the steel wire rope W made of an elongated material, and second magnetic field application units 12a and 12b provided on the side of the detector opposite to the first magnetic field application units 11a and 11b in the X direction and configured to apply a magnetic field in a Y1 direction parallel to a plane that intersects with the X direction and opposite to the Y2 direction to the steel wire rope W made of an elongated material. That is, the magnetic field application unit 1 is configured to apply the magnetic fields in a direction substantially orthogonal to the X direction, which is the longitudinal direction of the elongated material. The Y direction (Y1 and Y2 directions) is an example of a "first direction" in the claims. The X direction (X1 and X2 directions) is an example of a "second direction" in the claims.

Figure 2:
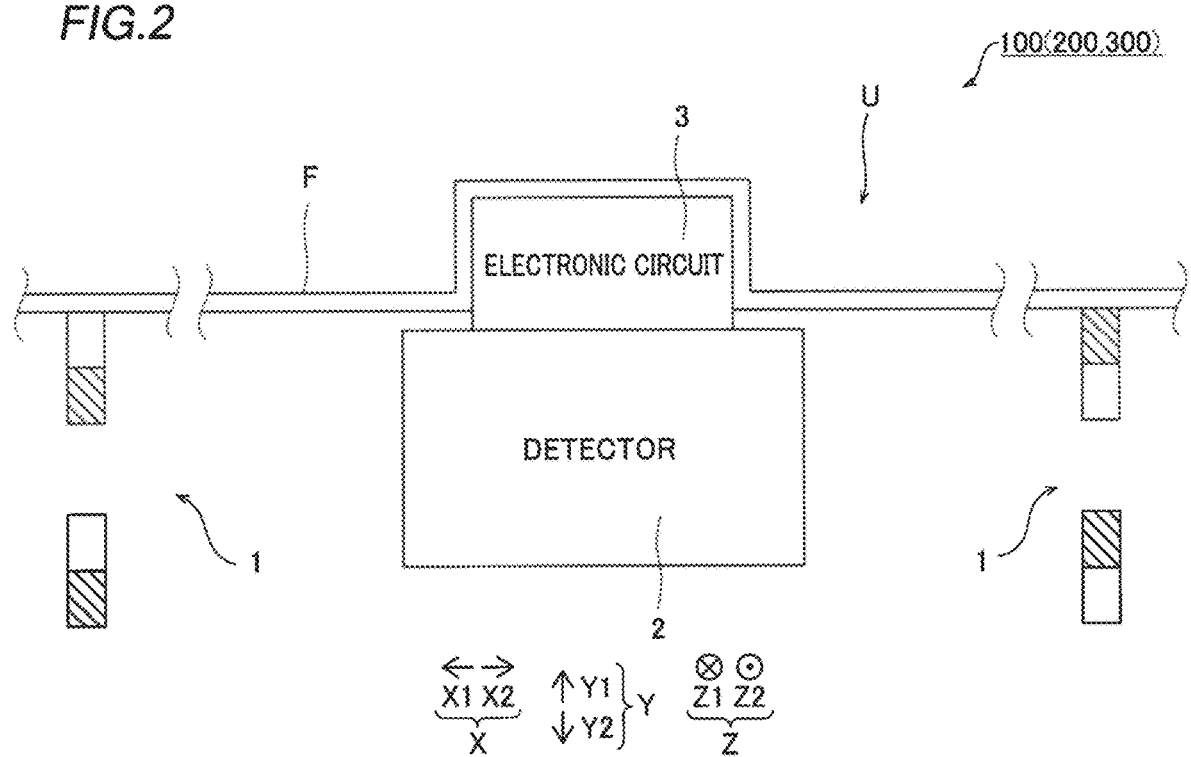
FIG. 2 is a block diagram showing the overall configuration of the magnetic body inspection apparatus according to the first to third embodiments of the present invention.
Figure 3:
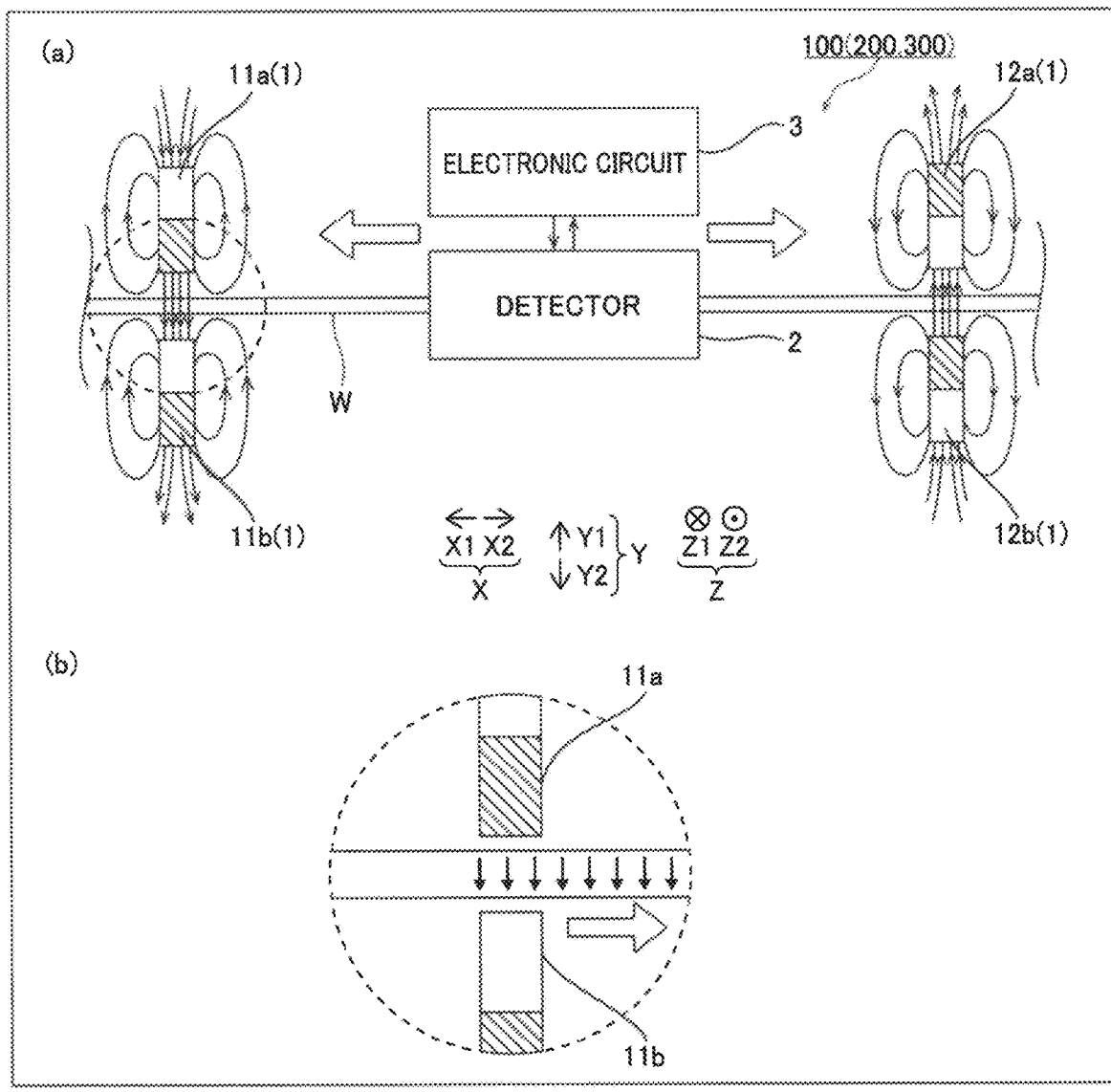
FIG. 3 is a diagram illustrating the magnetic field application direction of a magnetic field application unit according to the first embodiment of the present invention.

Specifically, the magnetic field application unit 1 (the first magnetic field application units 11a and 11b and the second magnetic field application units 12a and 12b) is fixed to the frame F (see FIG. 2). The magnetic field application unit 1 includes a permanent magnet, for example. The magnitudes of the magnetic fields applied by the magnetic field application unit 1 can be relatively strong such that the magnetization direction of the steel wire rope W is substantially uniformly adjusted in the Y direction (in the portion without a flaw or the like).

The first magnetic field application units 11a and 11b are provided in such a manner that the N pole (hatched) of the first magnetic field application unit 11a directed in the Y2 direction and the S pole (not hatched) of the first magnetic field application unit 11b directed in the Y1 direction face each other with the steel wire rope W interposed therebetween. Thus, the first magnetic field application units 11a and 11b apply the magnetic field to the steel wire rope W that passes through between the first magnetic field application units 11a and 11b, as shown in FIG. 3(b), and the magnetization direction is adjusted in the Y2 direction orthogonal to the direction in which the steel wire rope W extends.

The second magnetic field application units 12a and 12b are provided in such a manner that the S pole (not hatched) of the second magnetic field application unit 12a directed in the Y2 direction and the N pole (hatched) of the second magnetic field application unit 12b directed in the Y1 direction face each other with the steel wire rope W interposed therebetween. Thus, the second magnetic field application units 12a and 12b apply the magnetic field to the steel wire rope W that passes through between the second magnetic field application units 12a and 12b, and the magnetization direction is adjusted in the Y1 direction orthogonal to the direction in which the steel wire rope W extends (illustration of the magnetization direction is omitted).

When the inspection unit U is moved in the X1 direction such that the magnetic field application unit 1 and the detector 2 provided in the inspection unit U are moved relative to the steel wire rope W, the first magnetic field application units 11a and 11b apply the magnetic field in advance to a portion to be inspected by the detector 2, and the magnetization direction is adjusted. When the inspection unit U is moved in the X2 direction such that the magnetic field application unit 1 and the detector 2 provided in the inspection unit U are moved relative to the steel wire rope W, the second magnetic field application units 12a and 12b apply the magnetic field in advance to the portion to be inspected by the detector 2, and the magnetization direction is adjusted. Therefore, regardless of the direction in which the relative movement is performed, the magnetic field application unit 1 can apply the magnetic field in advance to the steel wire rope W and adjust the magnetization direction.

A direction in which the first magnetic field application units 11a and 11b apply the magnetic field and a direction in which the second magnetic field application units 12a and 12b apply the magnetic field are the Y2 direction and the Y1 direction, which are opposite to each other. Therefore, before and after inspection, a direction in which the steel wire rope W is magnetized by the magnetic field application unit 1 is reversed, and thus the magnetization is unlikely to remain in the steel wire rope W after inspection.

The magnetic field application unit 1 is spaced apart from the detector 2 in the X direction in which the steel wire rope W made of an elongated material extends such that the output magnetic field does not affect detection by the detector 2. Specifically, when the relative positional relationship between the magnetic field application unit 1 and the detector 2 with respect to the steel wire rope W is changed due to the deflection of the steel wire rope W or the backlash of the frame F to which the magnetic field application unit 1 and the detector 2 are fixed, for example, noise is generated in a detection signal. Therefore, the magnetic field application unit 1 is spaced apart from the detector 2 to such an extent that the influence on the detector 2 does not become a problem.

The magnetic field applied to the magnetic body by the magnetic field application unit 1 is larger than a magnetic field generated by an excitation coil 21 (described below) to excite the magnetization state of the steel wire rope W. Specifically, the magnetic field applied by the magnetic field application unit 1 needs to be relatively large in order to adjust (align) the magnetization direction of the steel wire rope W substantially in the Y2 direction. On the other hand, a relatively small magnetic field is sufficient for the excitation coil 21 to excite the magnetization of the steel wire rope W. The details are described below.

Figure 4:
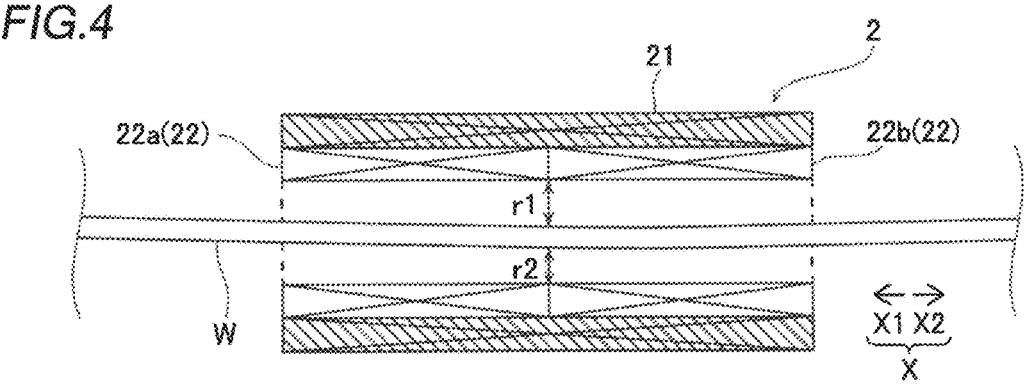
FIG. 4 is a diagram illustrating an excitation coil and a detection coil according to the first embodiment of the present invention.
Figure 5:
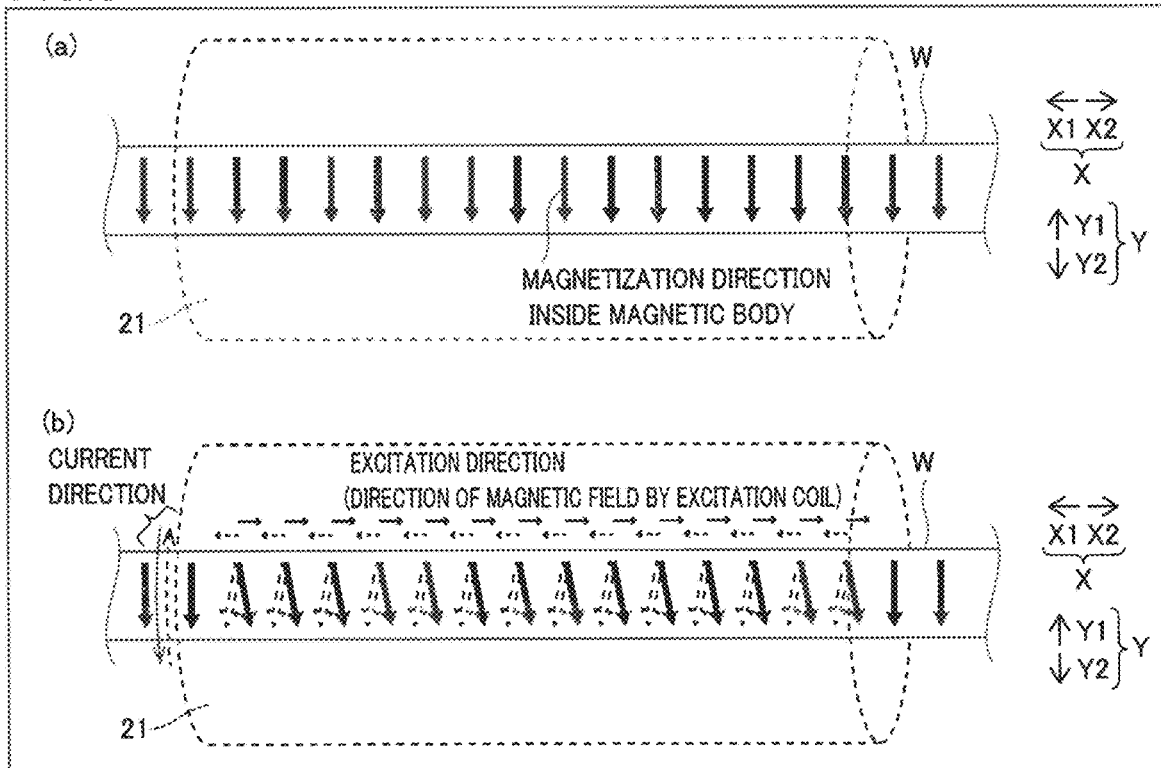
FIG. 5 is a diagram illustrating excitation of the magnetization of the excitation coil according to the first embodiment of the present invention.

The detector 2 includes the excitation coil 21 and a detection coil 22, as shown in FIG. 4. As shown in FIG. 3(a) and FIG. 4, the excitation coil 21 and the detection coil 22 are coils including conducting wire portions wound a plurality of times along the longitudinal direction around the direction in which the steel wire rope W, which is a magnetic body made of an elongated material, extends as a central axis, and cylindrically formed along in the X direction (longitudinal direction) in which the steel wire rope W extends. Therefore, a formation surface of the wound conducting wire is substantially orthogonal to the longitudinal direction, and the steel wire rope W passes through the coils. The detection coil 22 is provided inside the excitation coil 21.

An excitation current flows through the excitation coil 21 such that a magnetic field generated based on the excitation current inside the excitation coil 21 is applied along the X direction. Thus, the excitation coil 21 excites the magnetization state of the steel wire rope W. Specifically, as shown in FIG. 5(a), the magnetization direction is adjusted in advance by the magnetic field application unit 1, and thus when there is no application of the magnetic field by the excitation coil 21, in a portion in which there is no flaw or the like, the magnetization direction of the steel wire rope W is aligned substantially in the Y2 direction. As shown in FIG. 5(b), when an alternating current (excitation current) having a constant magnitude and a constant frequency flows into the excitation coil 21 from the outside, a magnetic field is applied to vibrate in the X direction in which the steel wire rope W extends (a magnetic field in the X1 direction and a magnetic field in the X2 direction appear periodically). Furthermore, along with the time-varying direction (a solid line or a dotted line) of the excitation current that flows through the excitation coil 21, the direction of the magnetic field (a solid line or a dotted line) applied by the excitation coil 21 also changes.

Therefore, the magnetization direction of the steel wire rope W is excited by the time-varying magnetic field, and the magnetic field emitted from the steel wire rope W also changes over time. Consequently, the magnetic field in the same portion of the steel wire rope W changes over time without changing a relative position between the steel wire rope W and the detection coil 22, and thus the state of the steel wire rope W can be determined by the detection coil 22 (described below) that detects a variation in the magnetic field.

The detection coil 22 is configured to detect a variation in the magnetic field of the magnetic body in the X direction and to generate a voltage. In addition, the detection coil 22 is configured to detect a variation in the magnetic field, in the X direction that intersects with the Y2 direction, of the steel wire rope W to which the magnetic field is applied in the Y2 direction by the magnetic field application unit 1 and to output a voltage based on the detected variation in the magnetic field of the steel wire rope W in the X direction. In addition, the detection coil 22 is disposed in such a manner that substantially all of the magnetic field generated by the excitation coil 21 can be detected (input).

The detection coil 22 is a differential coil including detection coils 22a and 22b, which are two coil portions. Furthermore, the detection coil 22 detects a variation in the magnetic field in the X direction of the steel wire rope W, the magnetization state of which has been excited due to the magnetic field generated by the excitation current that flows through the excitation coil 21.

Figure 6:
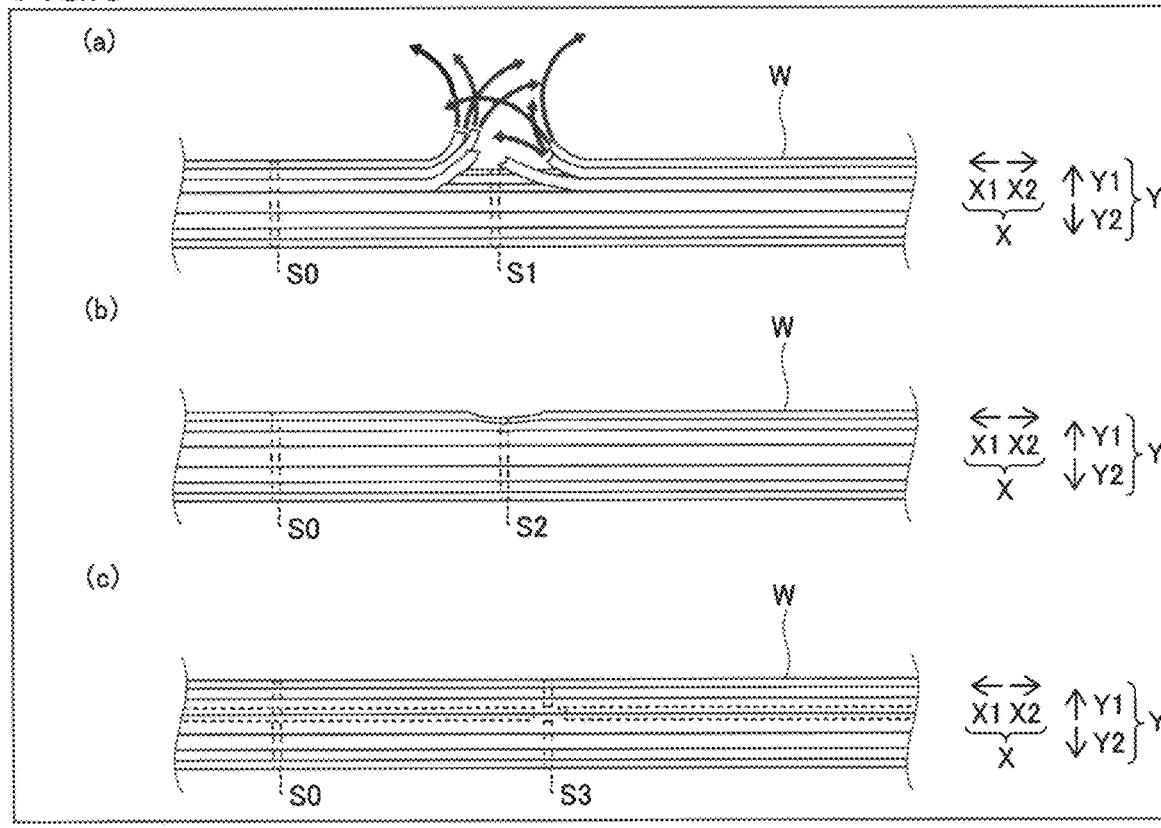
FIG. 6 is a diagram showing the case in which there is a flaw or the like in a steel wire rope.

FIG. 6 shows an example of the steel wire rope W having a flaw or the like. In FIG. 6, the way of braiding wires is shown in a simplified manner. In the steel wire rope W of FIG. 6(a), wires in the surface portion are broken. Therefore, the magnetic field leaks from a portion in which the wire breakage occurs. In the steel wire rope W of FIG. 6(b), a dent has occurred in the surface portion due to rubbing or hitting. In the steel wire rope W of FIG. 6(c), wire breakage has internally occurred. The cross-sectional areas S1, S2, and S3 at the positions with these flaws or the like are respectively smaller than the cross-sectional areas S0 in the portions without the flaws or the like, and thus the total magnetic fluxes (values obtained by multiplying the magnetic fields by the magnetic permeabilities and the areas) of the steel wire ropes W are reduced in the portions with the flaws or the like. As described above, the leakage of the magnetic field and the reduction of the total magnetic flux occur, and thus the detected magnetic fields are changed in the portions with the flaws or the like.

Consequently, for example, the value of a voltage detected by the detection coil 22a located in the portion with the flaw or the like is reduced as compared with that detected by the detection coil 22b, and thus the value of a difference (detection signal) in a voltage detected by the differential coil (entire detection coil 22) increases. That is, the detection signal in the portion without the flaw or the like is substantially zero and the detection signal has a value larger than zero in the portion with the flaw or the like, and thus the differential coil detects a clear signal (a signal with a good S/N ratio) indicating the presence of a flaw or the like. Thus, the electronic circuit 3 (described below) can detect the presence of a flaw or the like in the steel wire rope W based on the value of the difference in the detection signal. In addition, the value of the detection signal increases as the size of the flaw or the like (the size of a reduction in the cross-sectional area) increases, and thus when the size of the flaw or the like is determined (evaluated), the presence of the flaw or the like larger than a certain degree enables automatic determination that the detection signal has exceeded a predetermined first threshold Th1 or second threshold Th2 (described below). In addition, a variation in the magnetic permeability due to rust etc. is also included in a flaw or the like, and it similarly appears as a detection signal.

Figure 7:
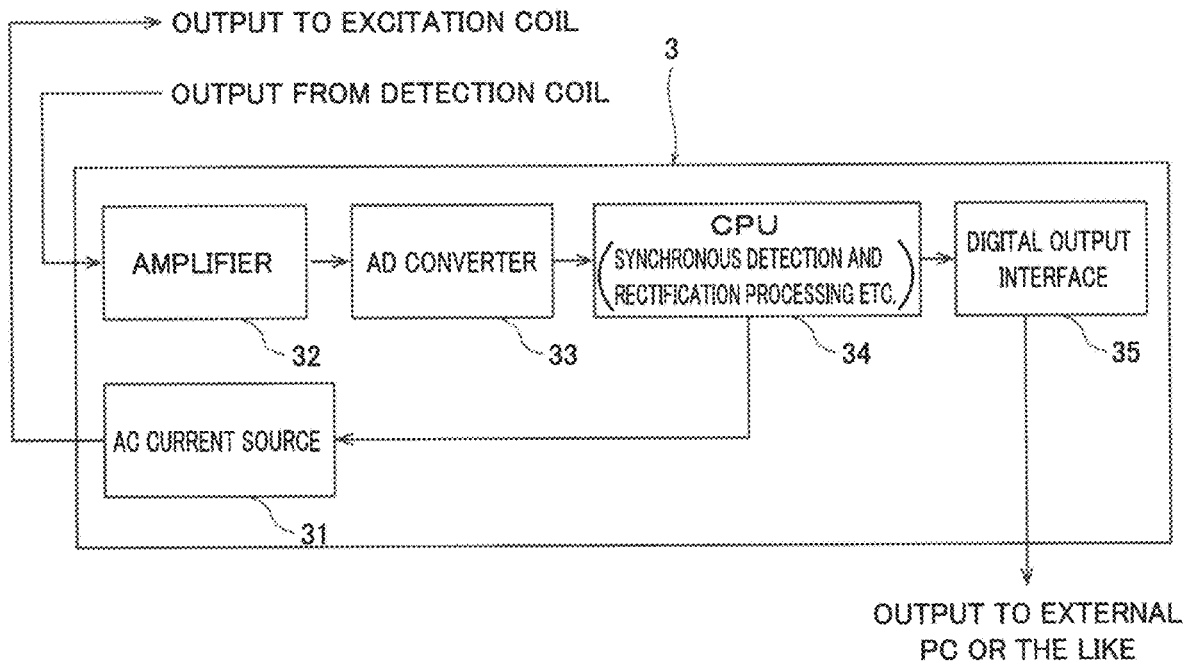
FIG. 7 is a block diagram showing an electronic circuit according to the first embodiment of the present invention.

As shown in FIG. 7, the electronic circuit 3 is configured to determine the state of the steel wire rope W made of an elongated material based on the signal from the detection coil. The electronic circuit 3 includes an AC source 31, an amplifier 32, an AD converter 33, a CPU 34, and a digital output interface 35. The AC source 31 passes (outputs) an alternating current to the excitation coil 21. The amplifier 32 amplifies the detection signal (a current based on the strength of the magnetic field of the steel wire rope W in the X direction) output from the detection coil 22 and outputs the amplified signal to the AD converter 33. The AD converter 33 converts the analog detection signal amplified by the amplifier 32 into a digital detection signal. The CPU 34 performs processing for removing an AC component from the detection signal output from the AD converter 33, performs synchronous detection and rectification processing for converting the detection signal, from which the AC component has been removed, into a signal (DC level signal) corresponding to a variation in the absolute value of the detection signal, and outputs an alarm signal when the detection signal exceeds a predetermined threshold described below. The CPU 34 controls the intensity of the current output from the AC source 31. In addition, the CPU 34 has a function of determining the size of a flaw or the like. The digital output interface is connected to an external PC (not shown) or the like, and outputs digital data of the processed detection signal or alarm signal. In addition, the external PC stores the magnitude of the input signal in a memory, displays a graph of the magnitude of the signal over time, and controls, for example, the moving speed of the detector 2 (integrated frame) with respect to the steel wire rope W via the CPU 34.

The electronic circuit 3 is configured to output a first threshold signal indicating that the detection signal output from the detection coil 22 (detector 2) exceeds the first threshold Th1 to the outside when the detection signal exceeds the first threshold Th1, and to output a second threshold signal indicating that the detection signal output from the detector 2 exceeds the second threshold Th2 to the outside when the detection signal exceeds the second threshold Th2.

Comparative Example

The magnetization by the magnetic field application unit 1 of the inspection apparatus 100 is now described in comparison with a magnetic body inspection apparatus 101 according to a comparative example configured similarly except that a magnetic field application unit 1 is not provided.

In the magnetic body inspection apparatus 101 (not shown) according to the comparative example in which a magnetic field application unit 1 is not provided, a magnetic field is applied in an X direction by an excitation coil 21. At this time, it is necessary to increase the magnetic field to be applied in the X direction by the excitation coil 21 such that detection signals (the magnitudes of the magnetic fields of a magnetic body including temporal changes in the magnetic fields accompanying the movement, excitation, etc.) detected in uniform portions without flaws or the like are equal to each other. In addition, the magnetization direction is not adjusted (aligned) in advance, and thus the magnetic field applied in the X direction by the excitation coil 21 needs to be large enough to align the magnetization direction substantially in the X direction.

Figure 8:
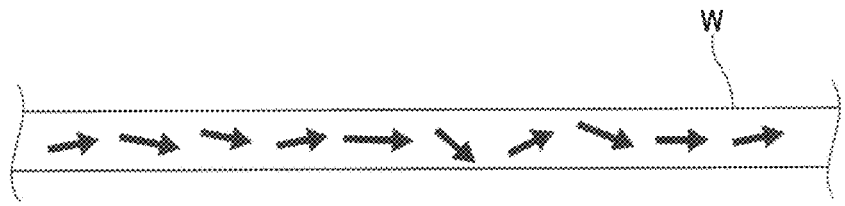
FIG. 8 is a diagram illustrating the magnetization direction of a steel wire rope according to a comparative example.

As shown in FIG. 8, before the magnetic field is applied, the magnetization direction inside a steel wire rope W, which is a magnetic body, varies among the internal structures at the time of manufacture. In addition, the steel wire rope W passes through a mechanism such as a pulley, and an external force such as a stress is applied to the steel wire rope W such that the magnetization direction changes. Therefore, even when the magnetization direction is excited in the X direction by the excitation coil 21, variations in the magnetization direction cannot be eliminated even in homogeneous portions without a flaw or the like, and thus variations in the magnetization magnitude and the magnetization direction among portions of the steel wire rope W cause noise in the detection signal.

On the other hand, when the magnetization magnitude and the magnetization direction are adjusted (aligned) by applying a magnetic field in advance, the magnetic field of a portion without a flaw or the like of the magnetic body is detected with a substantially constant magnitude, and thus it is easy to distinguish a signal arising from the flaw from the noise.

Especially in the case of a steel wire rope W which is an elongated material, the magnetization magnitude of the steel wire rope W (generally a magnetic body) magnetized in a short-side direction (Y direction) is reduced to a few tenths to a few thousandths depending on the thickness of the steel wire rope W, as compared with the steel wire rope W magnetized in a longitudinal direction (X direction). In addition, the magnetization direction is adjusted in the short-side direction (Y direction), and thus the problem of residual magnetization is alleviated.

Figure 9:
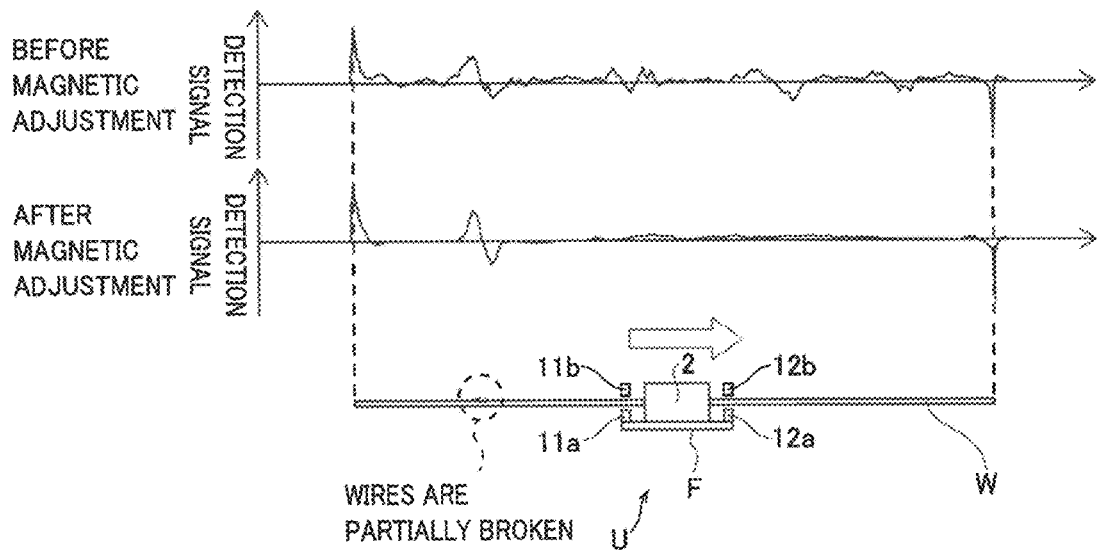
FIG. 9 is graphs of the values of detection signals of magnetic bodies according to the first embodiment of the present invention and the comparative example.

Graphs of FIG. 9 show changes in the magnetic fields of the steel wire ropes W in the comparative example and the first embodiment. The vertical axis of each of the graphs corresponds to the magnitude of the detection signal, and the horizontal axis of each of the graphs corresponds to the detection position (the position at which the steel wire rope W is detected). Synchronous detection and rectification processing is performed by the CPU 34, and thus the influence of a temporal variation in the magnetic field applied by the excitation coil 21 is removed.

In the magnetic body inspection apparatus 101 according to the comparative example in which a magnetic field application unit 1 is not provided, noise due to variations in the magnetization magnitude and the magnetization direction is detected even in a portion without a flaw or the like, as shown in the graph before magnetic adjustment of FIG. 9. Therefore, in the magnetic body inspection apparatus 101 according to the comparative example, it is difficult for a non-expert without experience or knowledge (such as the pattern of appearance of the detection signal) to determine the presence or absence of a flaw or the like. Especially when a threshold or the like is provided and a determination is made based only on the magnitude of the signal, an error occurs in the determination.

On the other hand, in the inspection apparatus 100 according to the first embodiment in which the magnetic field application unit 1 is provided, noise is hardly detected, as shown in the graph after magnetic adjustment of FIG. 9. Specifically, the magnitude of noise is relatively small, the graph showing a good S/N ratio is obtained, and the detection signal appears clearly. Therefore, noise can be reduced by the magnetic field application unit 1 to such an extent that an erroneous determination does not occur even when a determination is made by a non-expert or with a threshold. In the graph after magnetic adjustment of FIG. 9, the positive and negative reversal of the detection signal appears clearly when the position of the portion with a flaw or the like of the steel wire rope W moves from one side of the differential coil to the other side.

Advantages of First Embodiment

According to the first embodiment of the present invention, the following advantages are obtained.

According to the first embodiment of the present invention, as described above, the inspection apparatus 100 includes the detector 2 configured to output the detection signal in accordance with a variation in the magnetic field of the steel wire rope W after the magnetic field application unit 1 applies a magnetic field to the steel wire rope W in advance, and the electronic circuit 3 configured to determine the state of the steel wire rope W based on the detection signal output from the detector 2. Accordingly, the magnetic field is applied to the steel wire rope W in advance, and thus the magnetization of the uniform portion (the portion without a flaw or the like) of the steel wire rope W is substantially adjusted. On the other hand, the magnetic field of the portion with a flaw or the like of the steel wire rope W is not adjusted. Consequently, the detection signal output from the detector 2 is different between the portion with a flaw or the like and the portion without a flaw or the like such that the electronic circuit 3 can easily determine the state (the presence or absence of a flaw or the like) of the steel wire rope W.

According to the first embodiment, as described above, the inspection apparatus 100 includes the detector 2 configured to detect a variation in the magnetic field of the steel wire rope W in the X direction substantially orthogonal to the Y direction after the magnetic field application unit 1 applies a magnetic field in the Y2 direction to the steel wire rope W, and to output the detection signal in accordance with the detected variation in the magnetic field of the steel wire rope W in the X direction, and the electronic circuit 3. Accordingly, the magnetic field is applied in advance in the Y direction substantially orthogonal to the X direction, which is a detection direction in which a variation in the magnetic field is detected, to the steel wire rope W, and thus the magnetization of the uniform portion (the portion without a flaw or the like) of the steel wire rope W is adjusted substantially in the Y direction. Consequently, the magnetic field in the X direction is reduced (approximately zero) as compared with the case in which a magnetic field is not applied in advance in the Y direction. That is, variations in the magnetization magnitude and the magnetization direction are reduced and the magnetization direction is in a direction orthogonal to the detection direction, and thus generation of noise due to the variations can be significantly reduced or prevented. Consequently, it is possible to easily determine the state (the presence or absence of a flaw or the like) of the steel wire rope W.

According to the first embodiment, as described above, the steel wire rope W is made of an elongated material, the magnetic field application unit 1 is configured to apply a magnetic field in the direction (Y direction) substantially orthogonal to the longitudinal direction (X direction) of the steel wire rope W, which is an elongated material, and the detector 2 and the electronic circuit 3 are configured to detect a variation in the magnetic field of the steel wire rope W in the X direction. Accordingly, the magnetic field is applied in the short-side direction (the direction substantially orthogonal to the longitudinal direction), and thus the magnetization direction of the steel wire rope W can be more easily adjusted as compared with the case in which the magnetic field is applied in the relatively long longitudinal direction. Consequently, noise is further reduced, and thus the state (the presence or absence of a flaw or the like) of the steel wire rope W can be more easily determined. In addition, the magnetization of the magnetic body is reduced as compared with the case in which the magnetic body is magnetized in the longitudinal direction, and the magnetization direction is in the direction substantially orthogonal to the detection direction of the detector. Thus, noise is further reduced, and thus the state (the presence or absence of a flaw or the like) of the magnetic body can be more easily determined.

According to the first embodiment, as described above, the magnetic field application unit 1 is spaced apart from the detector 2 in the X direction in which the elongated material extends such that the output magnetic field does not affect detection by the detector 2. Accordingly, the accuracy of the S/N ratio of the detection signal is increased. Consequently, it is possible to significantly reduce or prevent noise caused by a variation in a relative position between the detector 2 and the magnetic field application unit 1.

According to the first embodiment, as described above, the magnetic field application unit 1 includes the first magnetic field application units 11a and 11b configured to apply a magnetic field in the Y2 direction to the steel wire rope W made of an elongated material, and the second magnetic field application units 12a and 12b provided on the side of the detector 2 opposite to the first magnetic field application units 11a and 11b in the X direction and configured to apply a magnetic field in the Y1 direction parallel to the plane that intersects with the X direction to the steel wire rope W made of an elongated material. Accordingly, when the variation in the magnetic field in the X direction is detected by relatively moving the magnetic field application unit 1 and the steel wire rope W to the X1 direction side, which is one side in the X direction, or the X2 direction side, which is the other side in the X direction, the magnetization direction of the steel wire rope W can be adjusted in the Y direction (the Y1 direction or the Y2 direction) by the magnetic field application unit 1 before the magnetic field is detected by the detector 2 even when the magnetic field application unit 1 and the steel wire rope W are relatively moved to any of the X1 direction side and the X2 direction side.

According to the first embodiment, as described above, the detection coil 22 configured to generate a detection signal is provided, and the electronic circuit 3 is configured to determine the state of the steel wire rope W made of an elongated material based on the detection signal. Accordingly, the detection coil 22 generates a dielectric voltage due to the total magnetic flux inside a closed curve formed by the wire of the detection coil 22 wound along the X direction in which the steel wire rope W extends, and thus a variation in the magnetic field of the steel wire rope W in the X direction can be easily detected.

According to the first embodiment, as described above, the detection coil 22 includes a differential coil, and the electronic circuit 3 is configured to determine the state of the steel wire rope W made of an elongated material based on the difference between the magnitudes of the voltages generated by the two coil portions included in the differential coil due to the magnetic field in the X direction. Accordingly, the difference between the voltages (detection signals) generated by one coil portion and the other coil portion of the differential coil is detected such that a local variation in the state (the presence or absence of a flaw or the like) of the steel wire rope W can be more easily detected.

The steel wire rope W that passes through the excitation coil 21 and the detection coil 22 may be slightly displaced from the central axes of the detection coils 22a and 22b (in the case of FIG. 4, distance r1>distance r2, for example) due to its deflection. The detection coils 22a and 22b are symmetric (cylindrically symmetrical) about the steel wire rope W as a central axis, and thus noise due to the displacement from the central axis of the steel wire rope W is significantly reduced or prevented.

Furthermore, the two detection coils 22a and 22b are provided in the detection coil 22 so as to become a differential coil, and thus the displacements from the central axis of the steel wire rope W in the coil portions become substantially equal to each other. Thus, noise due to the displacement from the central axis of the steel wire rope W is significantly reduced or prevented.

According to the first embodiment, as described above, the electronic circuit 3 is configured to output the two threshold signals (the first threshold signal and the second threshold signal) indicating that the detection signal output from the detector 2 exceeds the two predetermined thresholds Th1 and Th2 to the outside when the detection signal exceeds the two predetermined thresholds Th1 and Th2. Accordingly, the portion in which the state (the presence or absence of a flaw or the like) of the steel wire rope W is non-uniform can be easily determined based on the threshold signals. In the first embodiment, the magnetization direction of the steel wire rope W is adjusted in the Y direction, and thus noise is unlikely to be generated in detection of the magnetic field in the X direction, and the S/N ratio is improved. Therefore, even when a determination is made with the threshold Th, an erroneous determination can be made less likely to occur.

According to the first embodiment, as described above, the predetermined threshold Th includes the first threshold Th1 and the second threshold Th2, which is larger than the first threshold Th1, and the electronic circuit 3 is configured to output the first threshold signal indicating that the detection signal output from the detector 2 and the electronic circuit 3 exceeds the first threshold Th1 to the outside when the detection signal exceeds the first threshold Th1, and to output the second threshold signal indicating that the detection signal output from the detector exceeds the second threshold to the outside when the detection signal exceeds the second threshold Th2. Accordingly, the state of the steel wire rope W having a small flaw or the like that requires attention such as follow-up observation can be determined based on the first threshold signal indicating that the detection signal exceeds the relatively small first threshold Th1, and the state of the steel wire rope W having a relatively large flaw or the like that requires immediate replacement, for example, can be determined based on the second threshold signal indicating that the detection signal exceeds the relatively large second threshold Th2.

According to the first embodiment, as described above, the detector 2 is configured to detect a variation in the magnetic field in the X direction of the steel wire rope W, the magnetization state of which has been excited due to the magnetic field generated by the excitation current that flows through the excitation coil 21. Accordingly, the magnetization state of the portion with a flaw or the like of the steel wire rope W is excited by the excitation coil 21, and thus a variation in the magnetic field in the X direction of the portion with a flaw or the like of the steel wire rope W can be easily detected. Especially when a time-varying excitation is applied to the magnetization state of the steel wire rope W by supplying an alternating current or the like to the excitation coil 21, the magnetic field of the steel wire rope W also changes over time. Therefore, the magnetic field to be detected by the detector 2 can be changed and detected without relatively moving the steel wire rope W and the detector 2.

According to the first embodiment, as described above, the magnetic field applied to the steel wire rope W by the magnetic field application unit 1 is larger than the magnetic field generated by the excitation coil 21 to excite the magnetization state of the steel wire rope W. The magnetization direction of the steel wire rope W is adjusted in the Y direction by the large magnetic field applied in advance by the magnetic field application unit 1, and thus even when the magnetic field required to excite the magnetization state in the X direction in determination of the state of the steel wire rope W is smaller than the magnetization applied in the Y direction, the magnitude is sufficient for detection. That is, as compared with the case in which the magnetization direction is not adjusted in the Y direction, the magnitude of the magnetic field required to excite the magnetization state in the X direction can be reduced.

Furthermore, the magnetization direction of the steel wire rope W by the excitation coil 21 is substantially orthogonal to the magnetization direction (Y2 direction) of the magnetic body adjusted by the magnetic field application unit 1, and thus the magnetic field applied by the excitation coil 21 can be sufficiently detected by the detection coil 22 even when the magnetic field slightly swings in the X1 or X2 direction. Therefore, the magnetic field by the excitation coil 21 can be made sufficiently smaller than the magnetic field applied by the magnetic field application unit 1. Thus, the magnitude of the current that flows through the excitation coil 21 can be reduced (power saving can be achieved). In addition, the magnetic field application unit 1 includes a permanent magnet, and thus no electric power is required to adjust the magnetization direction. Consequently, even the inspection apparatus 100 or the like used in the mobile X-ray imaging apparatus 900 driven by a battery or the like can carry out an inspection.

According to the first embodiment, as described above, the steel wire rope W relatively movable with respect to the subject is provided in the mobile X-ray imaging apparatus 900, and the detector 2 is configured to detect the magnetic field in the X direction of the steel wire rope W configured to move the X-ray irradiator E1. Accordingly, the state (the presence or absence of a flaw or the like) of the wire used in the mobile X-ray imaging apparatus 900 can be easily determined.

Second Embodiment

The configuration of an inspection apparatus 200 according to a second embodiment is now described with reference to FIG. 10. In the inspection apparatus 200 according to the second embodiment, an excitation current supplied to an excitation coil is a direct current that does not change over time unlike the first embodiment.

Specifically, the inspection apparatus 200 includes an electronic circuit 302 provided in an inspection unit U. As shown in FIG. 10, the electronic circuit 302 includes a DC source 312. The DC source passes, to an excitation coil 21, a direct current that does not change over time (that becomes a constant value). Thus, in the excitation coil 21, a static magnetic field having a constant magnitude in an X direction is generated.

In the inspection apparatus 200 according to the second embodiment, a detector 202 is configured to detect a variation in the magnetic field of a steel wire rope W in the X direction at the detection position of the detector 2 when the steel wire rope W is moved relative to the detector 2 in the X direction at a constant speed, which is substantially constant.

Specifically, as the position of the steel wire rope W detected by a detection coil 22 of the detector 202 changes over time during inspection, the magnetic field detected by the detection coil 22 also changes over time. When the detection coil 22 passes through a portion without a flaw or the like of the steel wire rope W, the magnitude of the magnetic field in the X direction in the detection coil 22 is substantially constant, and thus a detection signal also has a constant value. On the other hand, when the detection coil 22 is located at a portion with a flaw or the like of the steel wire rope W, the magnitude of the magnetic field at the detection position changes over time, and thus the detection signal changes. Thus, the state (the presence or absence of a flaw or the like) of the steel wire rope W can be determined.

The remaining configurations of the second embodiment are similar to those of the first embodiment.

Advantages of Second Embodiment

According to the second embodiment, as described above, the detector 202 is configured to detect a variation in the magnetic field of the steel wire rope W in the X direction at the detection position of the detector 202 when the steel wire rope W is moved relative to the detector 2 in the X direction at the constant speed, which is substantially constant. Accordingly, a portion of the steel wire rope W in which the magnetic field is detected by the detector 202 changes with the relative movement, and thus it is possible to easily detect a flaw or the like by comparing the portion with the flaw or the like with the portion without the flaw or the like. In addition, the steel wire rope W is relatively moved at the constant speed such that the detection signal becomes substantially constant at the position without a flaw or the like, and a different detection signal is output at the position with a flaw or the like, and thus it becomes easy to determine the state of the steel wire rope W, such as the presence or absence of a flaw or the like.

The remaining advantages of the second embodiment are similar to those of the first embodiment.

Third Embodiment

The configuration of an inspection apparatus 300 according to a third embodiment is now described with reference to FIGS. 11 and 12. In the inspection apparatus 300 according to the third embodiment, magnetic sensor elements 23 configured to detect the magnetic field of a steel wire rope W are provided unlike the first embodiment.

Specifically, the inspection apparatus 300 includes a detector 203 and an electronic circuit 303 provided in an inspection unit. In addition, a plurality of detectors 203 are disposed in such a manner as to circumferentially surround the steel wire rope W in a plane orthogonal to the longitudinal direction of the steel wire rope W (twelve are disposed symmetrically with the steel wire rope W as an axis). Furthermore, the magnetic sensor elements 23 include any one or a combination of several of a coil, a coil with an excitation coil, a differential coil with an excitation coil, a Hall element, a magnetic impedance element, a magnetoresistance element, etc., for example. In the case of simply using a coil, a static magnetic field cannot be detected, and thus it is necessary to perform a measurement while moving a magnetic body. On the other hand, in the case of using an excitation coil in combination, it is possible to perform a measurement even in a state in which the magnetic body to be measured is made stationary. In addition, when a Hall element, a magnetic impedance element, or a magnetoresistance element is used, these elements themselves can measure a static magnetic field, and thus it is possible to perform a measurement even in a state in which the magnetic body to be measured is made stationary. A plurality of magnetic sensor elements 23 may be disposed at a plurality of locations so as to detect two or three directions. The magnetic sensor elements 23 can also be configured to detect not only the magnitude of a variation in the magnetic field but also the magnitude of the magnetic field.

Figure 12:
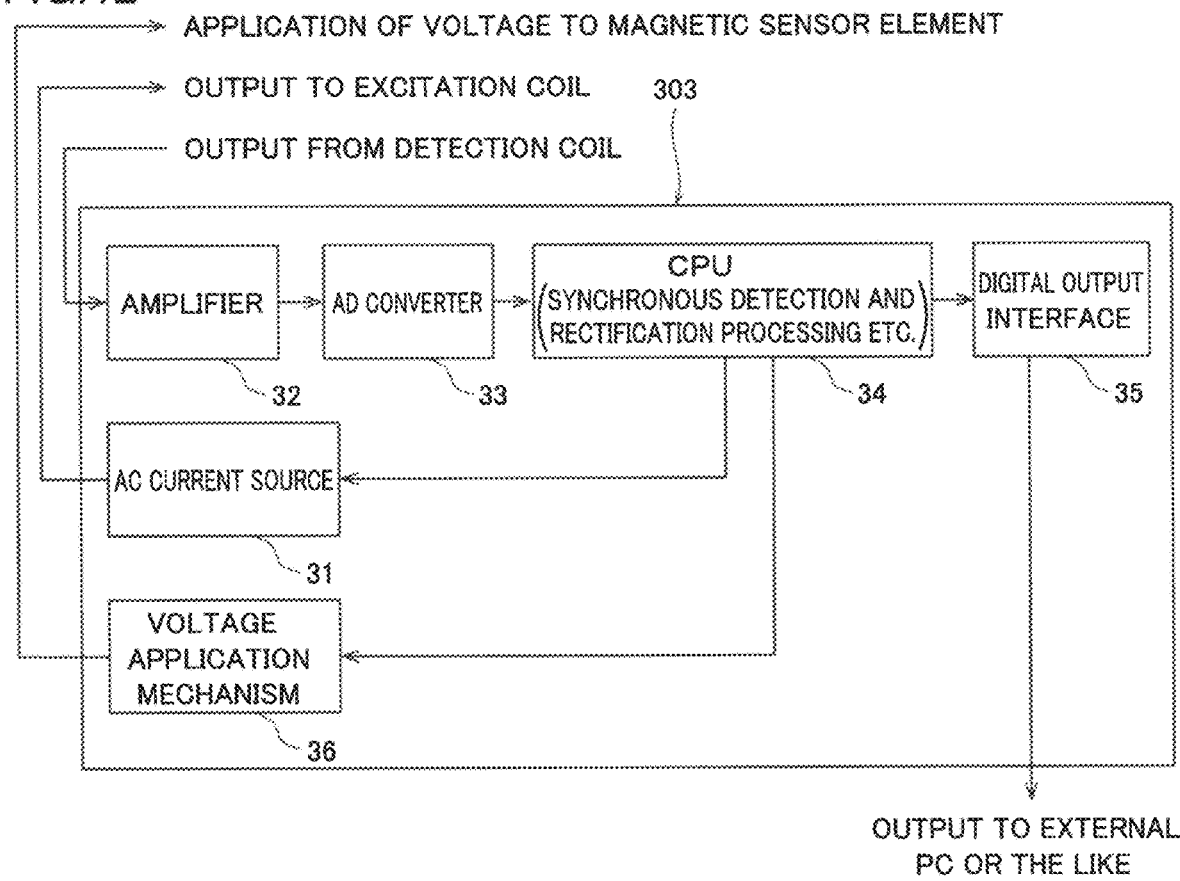
FIG. 12 is a block diagram showing an electronic circuit according to the third embodiment of the present invention.

As shown in FIG. 12, the electronic circuit 303 is configured to electrically control the magnetic sensor elements 23, process an electric signal from the detector 203, and output the electric signal as a detection signal.

The remaining configurations of the third embodiment are similar to those of the first embodiment.

Advantages of Third Embodiment

According to the third embodiment, as described above, the inspection apparatus 300 includes the detector 2 configured to detect the magnetic field or a variation in the magnetic field of the steel wire rope W after a magnetic field application unit 1 applies a magnetic field in a Y2 direction to the steel wire rope W, and to output a detection signal in accordance with the detected magnetic field of the steel wire rope W. Accordingly, the detection is performed in a state in which variations in the magnetization magnitude and the magnetization direction are reduced, and thus it is possible to easily determine the state (the presence or absence of a flaw or the like) of the steel wire rope W.

According to the third embodiment, as described above, the detector 2 includes at least one magnetic sensor element 23 configured to detect the magnetic field of the steel wire rope W and disposed outside the steel wire rope W. Accordingly, unlike the case in which the detector 2 includes a coil configured to detect a variation in the magnetic field of the steel wire rope W that passes through the coil, release from restrictions on the dimensions (such as the thickness) of the steel wire rope W is achieved, and the application range is expanded.

The remaining advantages of the third embodiment are similar to those of the first embodiment.

Fourth Embodiment

Figure 13:
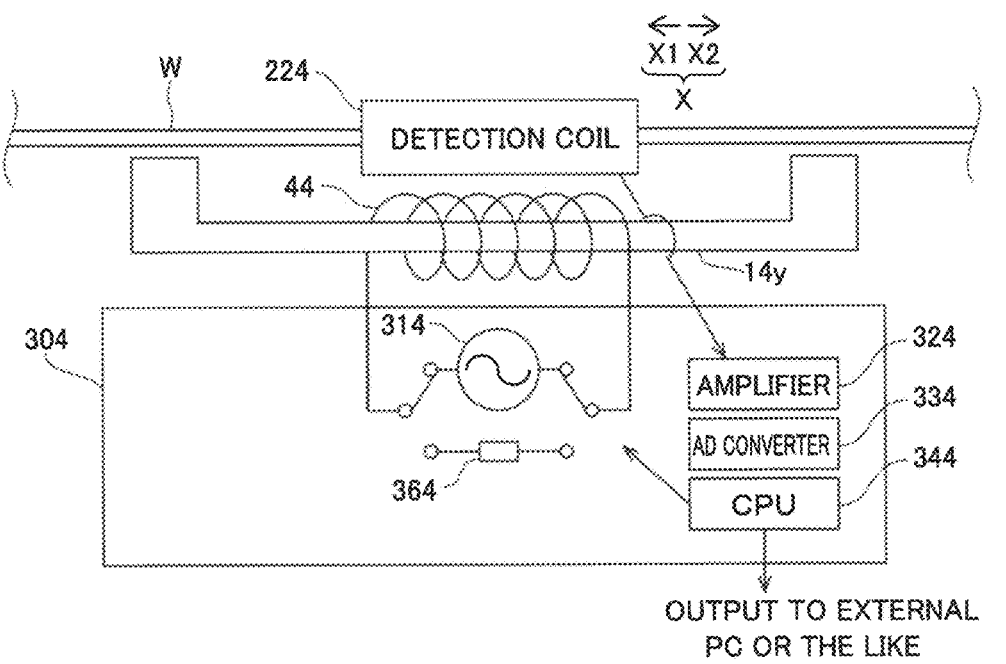
FIG. 13 is a diagram illustrating a magnetic field application unit according to a fourth embodiment of the present invention.

The configuration of an inspection apparatus 400 according to a fourth embodiment is now described with reference to FIG. 13.

The inspection apparatus 400 according to the fourth embodiment includes an electronic circuit 304 including an amplifier 324 configured to receive and amplify a detection signal output from a detection coil 224, an AD converter 334, a CPU 344, and an AC source 314 and a DC source 364, both of which are switchable. The inspection apparatus 400 further includes a coil portion 44 connected to one of the switchable AC source 314 and DC source 364, and a yoke 14y around which the coil portion 44 is wound.

In the inspection apparatus 400 according to the fourth embodiment, the DC source 316 is connected to the coil portion 44 when a magnetic field is applied to a steel wire rope W in advance. Thus, a magnetic circuit is formed by the steel wire rope W and the yoke 14y, and a magnetic field is applied to the steel wire rope W in advance. That is, the steel wire rope W is magnetized in advance in a direction substantially parallel to a longitudinal direction (X direction). In this case, the yoke 14y functions as a "magnetic field application unit" in the claims.

In the fourth embodiment, the AC source 314 is connected to the coil portion 44 at the time of measurement. A measurement is still performed after a region of the steel wire rope W to be measured is magnetized in advance in the longitudinal direction (X direction).

A current that flows through the coil portion 44 can be changed to an alternating current or a direct current by switching between the AC source 314 and the DC source 364, as described above. Furthermore, the CPU 344 performs the switching (selection) of the current source at the time of applying a magnetic field in advance and at the time of measurement, and increases or decreases the current amount.

Advantages of Fourth Embodiment

According to the fourth embodiment, as described above, the state of the steel wire rope W is determined after a magnetic field is applied to the steel wire rope W in advance. Accordingly, it is possible to easily determine the state (the presence or absence of a flaw or the like) of the steel wire rope W.

That is, as described above, even when a direction (X direction) in which a magnetic field is applied to a magnetic body in advance by the yoke 14y and a direction (X direction) in which the magnetic field is detected by a detector 2 are not orthogonal to (do not intersect with) each other, in a portion with a flaw or the like of the steel wire rope W, a generated magnetic field (or a variation in the magnetic field) is disturbed as compared with the remaining portion, and thus the magnetic field (or the variation in the magnetic field) is thereafter measured such that it is possible to determine whether or not a flaw or the like is present on the steel wire rope W.

However, when an AC magnetic field is applied by an excitation coil included in the detector, and a measurement is performed, magnetization in a direction orthogonal to the longitudinal direction of the steel wire rope W as in the first embodiment enables more accurate detection of a flaw or the like of the steel wire rope W.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

For example, while the example in which the magnetic body is an elongated material has been shown in each of the aforementioned first to fourth embodiments, the present invention is not limited to this. According to the present invention, the magnetic body may be a thin plate or an iron ball (bearing) other than an elongated material, for example. Besides, the present invention can be used to inspect all magnetic bodies having a uniform structure. When the magnetic body is a thin plate, for example, magnetization may be applied in a direction (thickness direction) perpendicular to a surface of the thin plate, and the magnetic field or a variation in the magnetic field in a direction in which the surface of the thin plate extends may be detected.

While the example in which the magnetic body made of an elongated material is used as the steel wire rope has been shown in each of the aforementioned first to fourth embodiments, the present invention is not limited to this. According to the present invention, the magnetic body made of an elongated material may be a thin plate, a square bar, a cylindrical pipe, a wire, or a chain, for example.

While the example in which the magnetic field application unit is integral and unitary with the inspection unit has been shown in each of the aforementioned first to fourth embodiments, the present invention is not limited to this. According to the present invention, the relative position between the magnetic field application unit and the detector may be changeable. Specifically, after the magnetization direction of the steel wire rope is adjusted in the direction orthogonal to the longitudinal direction by the magnetic field application unit, only the magnetic field application unit may be moved to a position away from the steel wire rope W. Accordingly, when the detector detects the magnetic field or a variation in the magnetic field of the steel wire rope, the magnetic field application unit can be separated such that the magnetic field of the magnetic field application unit does not affect the detector.

In each of the aforementioned first to third embodiments, when a magnetic field is applied in advance in the direction (Y direction) perpendicular to the direction (X direction) in which the steel wire rope extends, the configuration of the magnetic field application unit 1 may be as shown in FIG. 14. Specifically, as shown in FIG. 14(a), a direction in which first magnetic field application units 11e and 11f apply a magnetic field and a direction in which second magnetic field application units 12e and 12f apply a magnetic field may be the same as each other. Furthermore, as shown in FIG. 14(b), a direction in which first magnetic field application units 11g and 11h apply a magnetic field and a direction in which second magnetic field application units 12g and 12h apply a magnetic field may not be parallel to each other (may be respectively in a Y direction and in a direction inclined by an angle θ with respect to the Y direction). In addition, as shown in FIG. 14(c), magnetic fields may be applied in the same direction by single configurations (configurations that do not face others) as a first magnetic field application unit 11i and a second magnetic field application unit 12i. Moreover, as shown in FIGS. 14(d) and 14(e), magnetic field application units 13a and 13b (or a magnetic field application unit 13c) may be provided only on one side of a detector. The directions of the magnetic poles of the first magnetic field application units and the second magnetic field application units may be the same as each other (the Y2 direction, for example) or may be opposite to each other (the Y1 and Y2 directions, for example).

While when the application direction in which the magnetic field application unit 1 applies a magnetic field is the direction that intersects with the steel wire rope W, the application direction is taken as the direction orthogonal to the longitudinal direction of the steel wire rope W in each of the aforementioned first to third embodiments, the only requirement is that the magnetic field application unit be provided in such a manner that at least the application direction in which a magnetic field is applied intersects with the longitudinal direction of the steel wire rope (intersects in the range of 45 degrees to 135 degrees with respect to the longitudinal direction, which is the detection direction, for example).

While the example in which the magnetic field application unit includes a permanent magnet has been shown in each of the aforementioned first to third embodiments, the present invention is not limited to this. According to the present invention, the magnetic field application unit may include an electromagnet (coil).

Figure 15:
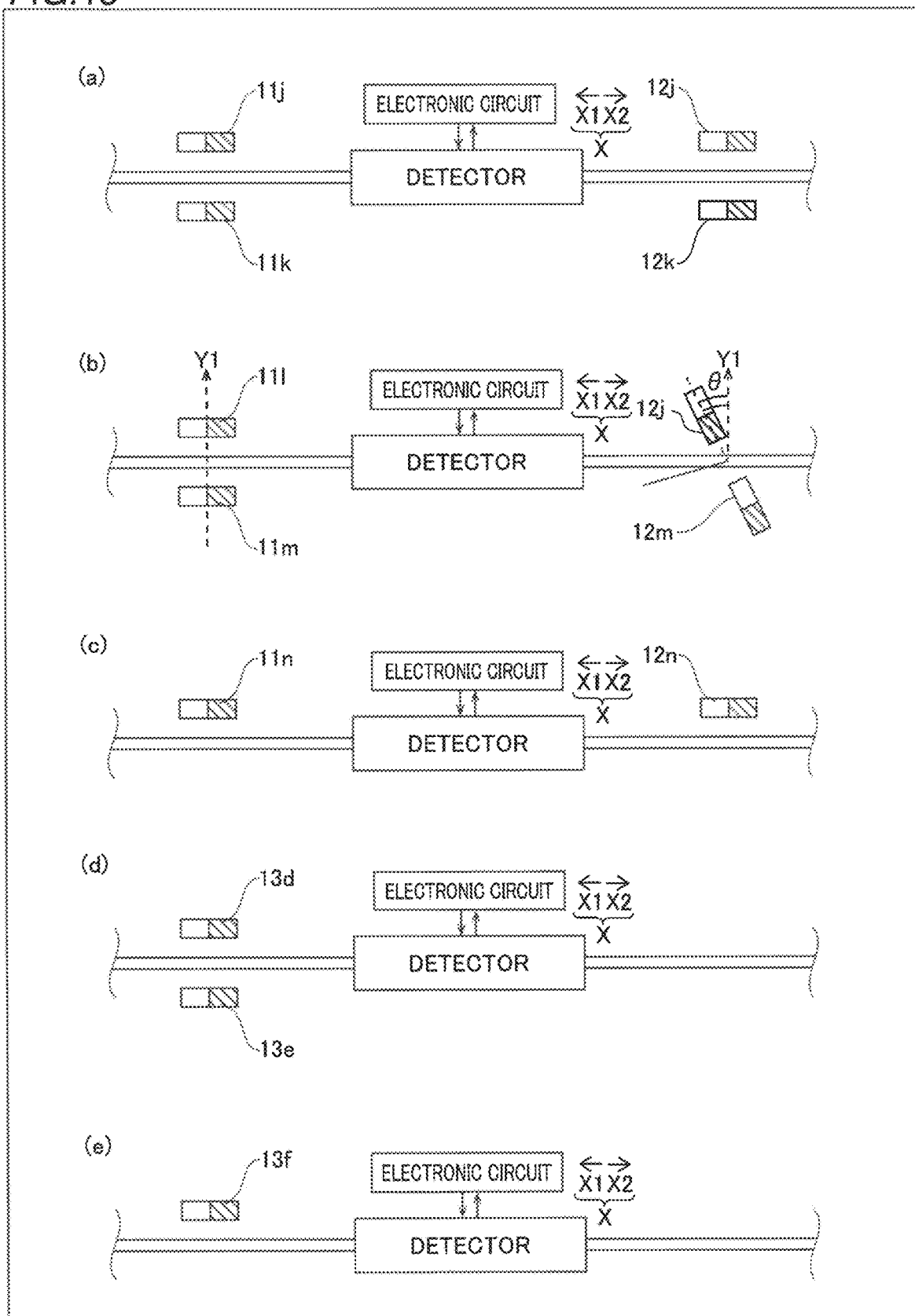
FIG. 15 is a diagram illustrating a magnetic field application unit according to a modified example of the fourth embodiment of the present invention.
Figure 16:
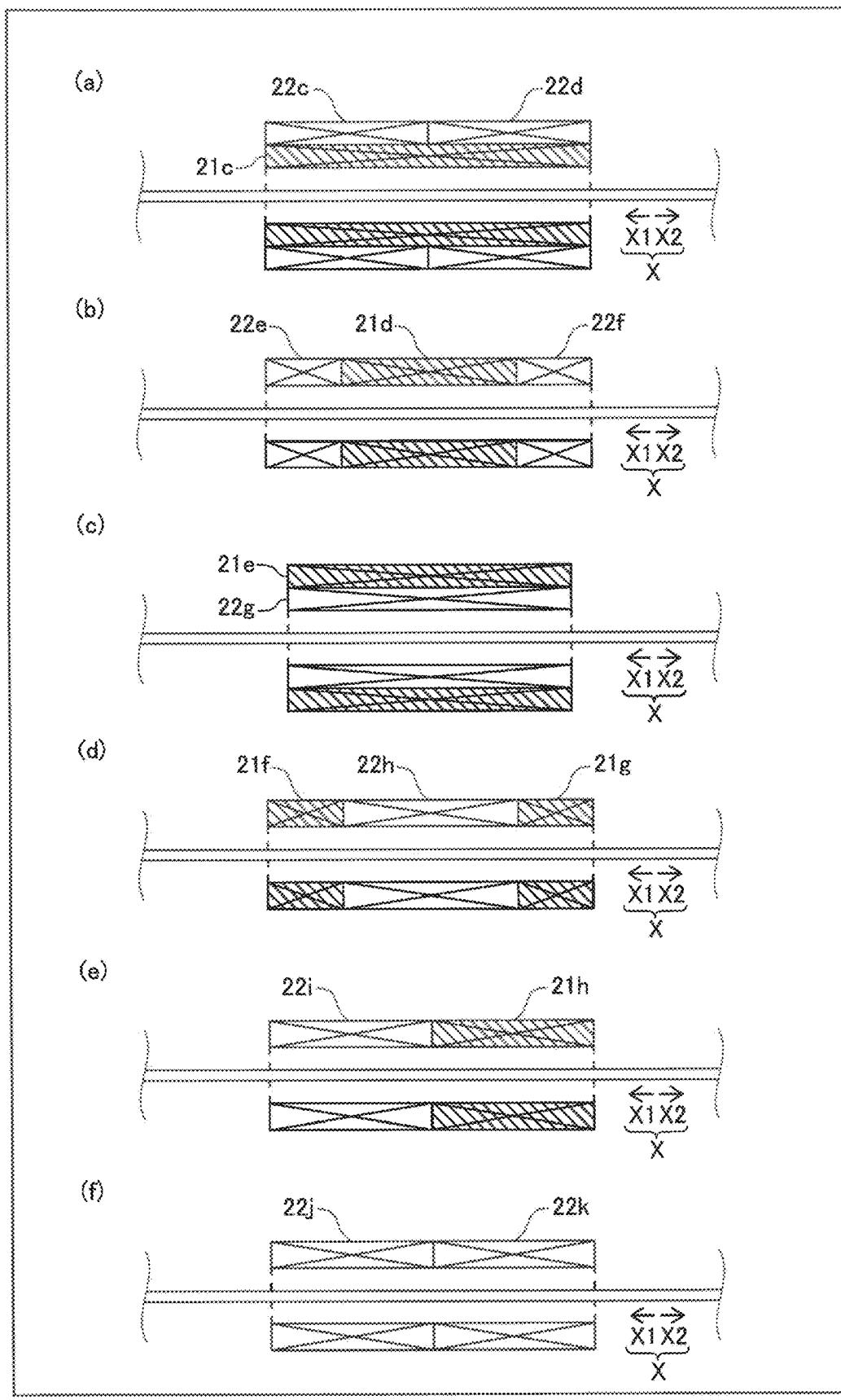
FIG. 16 is a diagram illustrating an excitation coil and a detection coil according to a modified example of the first and second embodiments of the present invention.

In the aforementioned fourth embodiment, when a magnetic field is applied in advance in the direction (X direction) along the direction in which the steel wire rope extends, the configuration of a magnetic field application unit 14 shown in FIG. 15 may be employed. Specifically, as shown in FIG. 15(a), a direction in which first magnetic field application units 11j and 11k apply a magnetic field and a direction in which second magnetic field application units 12j and 12k apply a magnetic field may be the same as each other (i.e., they may have the same characteristics). Furthermore, as shown in FIG. 15(b), a direction in which first magnetic field application units 11l and 11m apply a magnetic field and a direction in which second magnetic field application units 12l and 12m apply a magnetic field may not be parallel to each other (may be respectively in an X direction and in a direction inclined by an angle θ with respect to a Y direction). In addition, as shown in FIG. 15(c), magnetic fields may be applied in the same direction by single configurations (configurations that do not face others) as a first magnetic field application unit 11n and a second magnetic field application unit 12n (they may have the same characteristics). Moreover, as shown in FIGS. 15(d) and 15(e), magnetic field application units 13d and 13e (or a magnetic field application unit 13f) may be provided only on one side of a detector. The directions of the magnetic poles of the first magnetic field application units and the second magnetic field application units may be the same as each other (the X2 direction, for example) or may be opposite to each other (the X1 and X2 directions, for example). As in the fourth embodiment, a magnetic field may be applied in advance by the yoke, or a magnetic field may be applied in advance by a permanent magnet.

Figure 17:
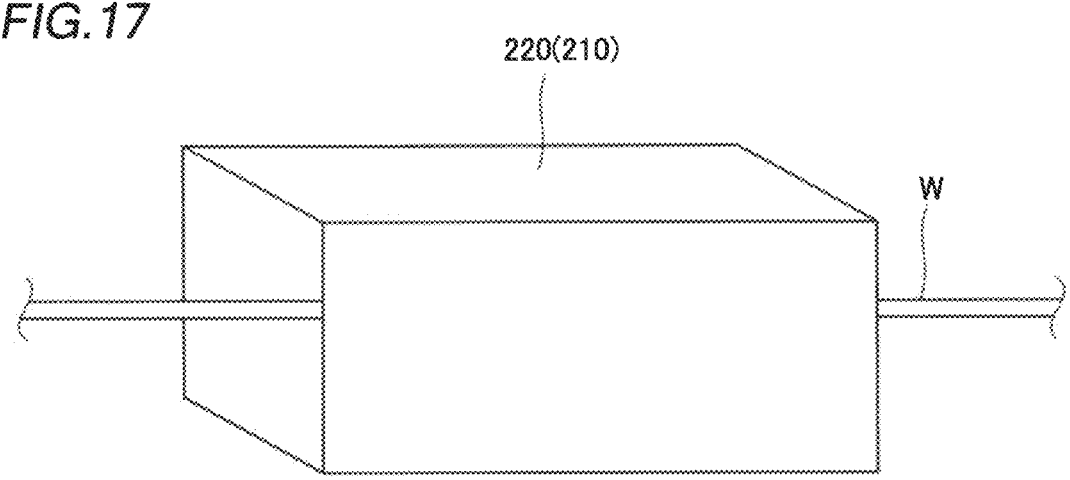
FIG. 17 is a diagram illustrating an excitation coil and a detection coil according to a modified example of the first to third embodiments of the present invention.

While the example in which the detection coils 22a and 22b serving as a differential coil are disposed inside the excitation coil 21 has been shown in each of the aforementioned first and second embodiments, the present invention is not limited to this. According to the present invention, as shown in FIG. 17(a), detection coils 22c and 22d including a differential coil may be disposed outside an excitation coil 21c. Furthermore, as shown in FIG. 17(b), detection coils 22e and 22f including a differential coil may be disposed on opposite sides of an excitation coil 21d in an X direction (longitudinal direction) so as to sandwich the excitation coil 21d. In addition, as shown in FIG. 17(c), a single detection coil 22g, which is not a differential coil, may be disposed inside (or outside) an excitation coil 21e. Moreover, as shown in FIG. 17(d), two excitation coils 21f and 21g may be disposed on opposite sides of a single detection coil 22h in an X direction (longitudinal direction) so as to sandwich the detection coil 22h. As shown in FIG. 17(e), a single excitation coil 21h and a single detection coil 22i may be disposed side by side in an X direction (longitudinal direction). Furthermore, as shown in FIG. 17(f), detection coils 22j and 22k (or a single detection coil) serving as a differential coil may be disposed without any excitation coils.

Figure 18:
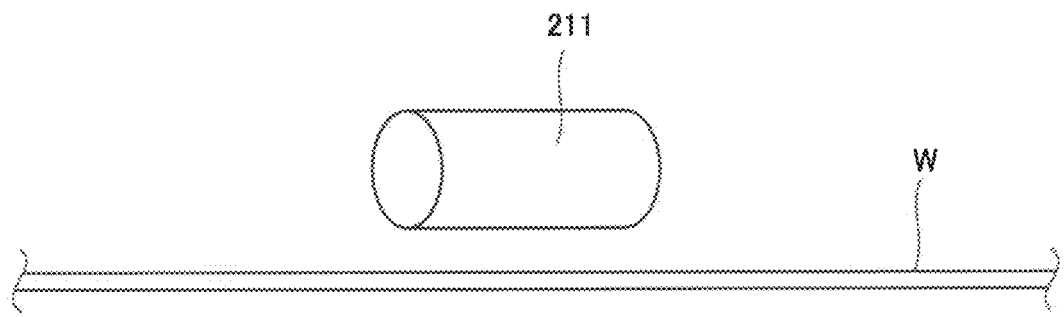
FIG. 18 is a diagram illustrating a detection coil according to a modified example of the first to fourth embodiments of the present invention.

While the example in which the cylindrical coils (the detection coil and the excitation coil) surround the steel wire rope W has been shown in each of the aforementioned first to third embodiments, the present invention is not limited to this. According to the present invention, as shown in FIG. 18, a detection coil 220 (excitation coil 210) may be in the form of a rectangular tube.

Figure 19:
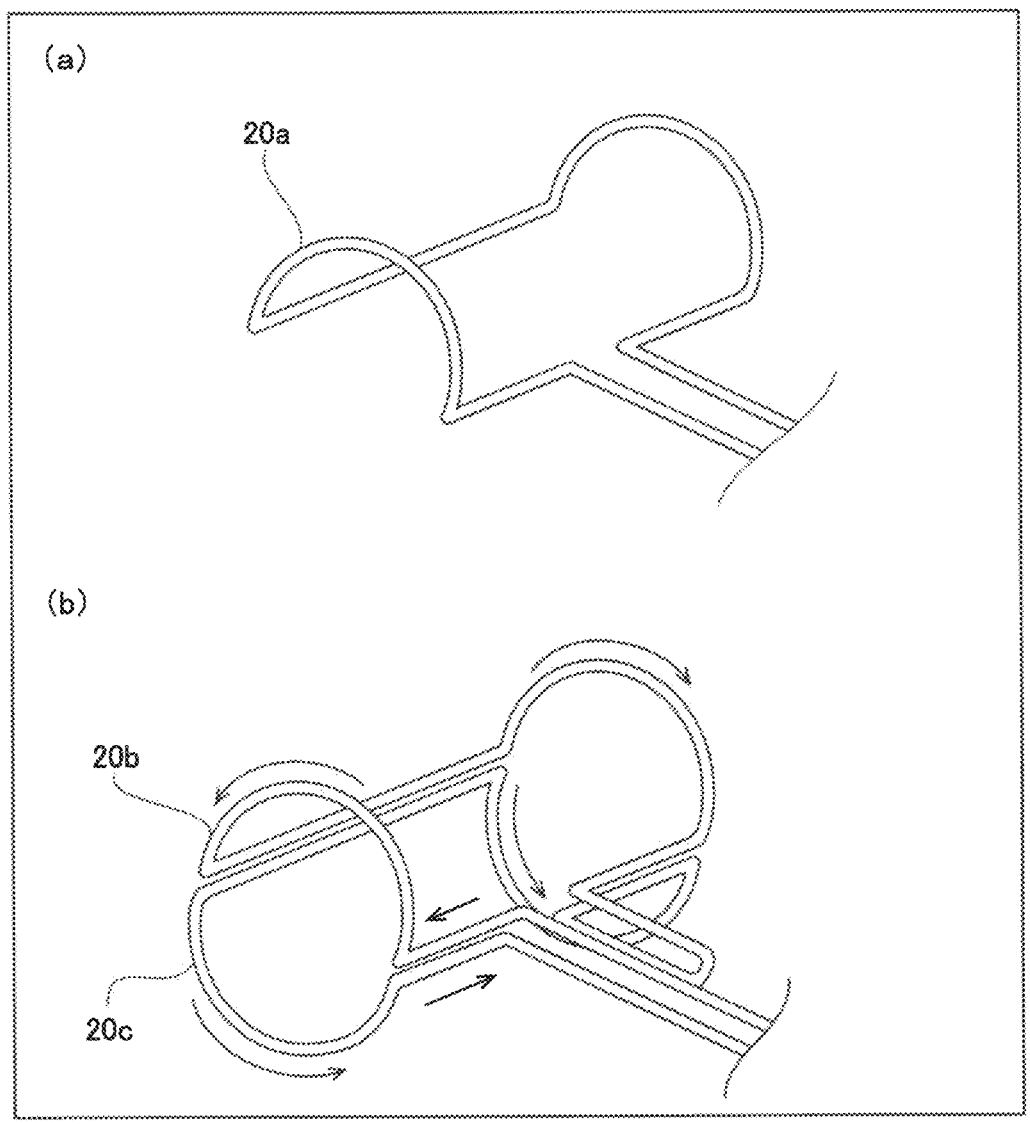
FIG. 19 is a diagram illustrating an excitation coil and a detection coil according to a modified example of the first to fourth embodiments of the present invention.
Figure 20:
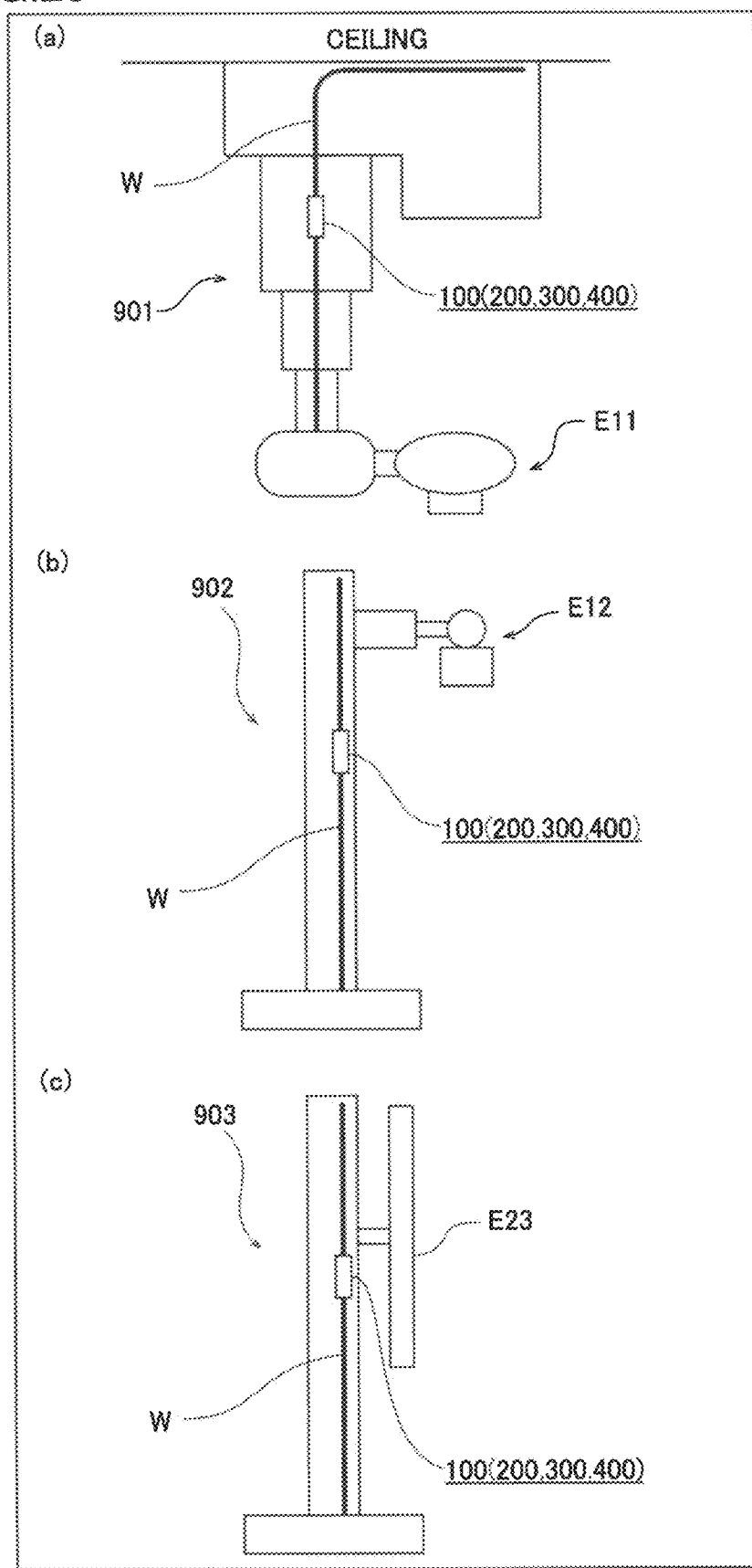
FIG. 20 is a diagram illustrating an X-ray imaging apparatus according to a modified example of the first to fourth embodiments of the present invention.

In each of the aforementioned first to fourth embodiments, as shown in FIG. 19, a detection coil 221 may be spaced apart from a steel wire rope W so as to detect a magnetic field in a direction along the steel wire rope W without surrounding the steel wire rope W. Alternatively, as shown in FIG. 20, a cylindrical coil 20b (see FIG. 20(b)) in which two semi-cylindrical (horseshoe-shaped) coil portions 20a (see FIG. 20(a)) are combined with each other may be used. The semi-cylindrical (horseshoe-shaped) coils can be easily removed even in a state in which a steel wire rope is installed (the ends are closed). In the fourth embodiment, the coil portion corresponds to an excitation coil.

While the example in which the plurality of magnetic sensor elements surround the steel wire rope has been shown in the aforementioned third embodiment, the present invention is not limited to this. According to the present invention, at least one magnetic sensor element may be disposed at a position at which the magnetic field of the steel wire rope can be detected. Alternatively, a plurality of magnetic sensor elements 23 may be disposed so as to detect two or three directions.

While the example in which the magnetic body inspection apparatus (inspection unit) is movable along the steel wire rope has been shown in each of the aforementioned first to fourth embodiments, the present invention is not limited to this. According to the present invention, the magnetic body inspection apparatus (inspection unit) may not be movable. In this case, the magnetic body inspection apparatus detects the magnetic field of the steel wire rope that passes through or near the magnetic body inspection apparatus at a fixed position.

While the example in which the electronic circuit is configured to output the signal to the outside when the detection signal output from the detection coil (detector) exceeds the predetermined threshold (the first threshold Th1 and the second threshold Th2) has been shown in each of the aforementioned first to fourth embodiments, the present invention is not limited to this. According to the present invention, the electronic circuit may be configured to count the number of times N the detection signal exceeds the threshold Th, and to output a signal indicating that the counted number of times N exceeds a predetermined number of times M to the outside when the counted number of times N exceeds the predetermined number of times M. Thus, the electronic circuit can count the number of times N the detection signal exceeds the threshold Th and determine the state of deterioration of the steel wire rope based on the number of flaws or the like. In addition, a change over time (the progress rate of deterioration, for example) in the state of the presence or absence of a flaw or the like of the steel wire rope W may be determined by comparing the number of times N the detection signal exceeds the threshold Th at the time of the previous measurement with the number of times N the detection signal exceeds the threshold Th at the time of the current measurement. Alternatively, the number of predetermined thresholds may be one or more than two (such as three).

While the example in which the inspection apparatus 100 (200, 300) is used in a mobile X-ray imaging apparatus (round-visit car) has been shown in each of the aforementioned first to fourth embodiments, the present invention is not limited to this. According to the present invention, the inspection apparatus 100 (200, 300) may be used in a stationary X-ray irradiation apparatus (X-ray imaging apparatus) 901 shown in FIG. 20(a), a stand-type X-ray irradiation apparatus (X-ray imaging apparatus) 902 shown in FIG. 20(b), or a stand-type X-ray detection apparatus (X-ray imaging apparatus) 903 shown in FIG. 20(c). Furthermore, the present invention is also applicable to an apparatus and infrastructure using a wire, a transportation device such as an elevator or a ropeway, and wire portions of a suspension bridge, a bridge pier, etc. In addition, the present invention is applicable to any applications that measure the damages of magnetic bodies such as not only wires but also utility poles, water and sewage pipes, gas pipes, and pipelines. An X-ray irradiator E11 and an X-ray irradiator E12 each include an X-ray tube or the like and emit X-rays, and an X-ray detector E23 includes a flat panel detector (FPD) or the like and detects the X-rays. The X-ray irradiator E11, the X-ray irradiator E12, and the X-ray detector E23 are each pulled and supported by a steel wire rope W. In addition, the inspection apparatus 100 (200, 300) is movable along the steel wire rope W.

In each of the aforementioned first to fourth embodiments, a flaw on a surface of the magnetic body is mainly detected as a "flaw or the like" of the magnetic body, but breakage (incomplete breakage, and in the case of a wire rope, breakage of any of wires), a variation in thickness, corrosion (rust), a crack, and non-uniform permeability are also included in the detection target. Furthermore, the detection target is not limited to something on the surface of the magnetic body, but may be something inside the magnetic body. In addition, in a state in which the magnetic field of the magnetic body or the non-uniformity of the magnetic field is generated, the state is detectable as the "magnetic state of the magnetic body".

Furthermore, "the magnetic field of the magnetic body or a variation in the magnetic field" includes not only the magnetic field or a variation in the magnetic field observed in the vicinity of the magnetic body to which a magnetic field is applied when the magnetic field is applied from the outside, but also a magnetic field generated from the magnetic body itself or a variation in the magnetic field when a magnetic field is not applied from the outside.

DESCRIPTION OF REFERENCE NUMERALS 1, 13a, 13b, 13c, 13d, 13e, 13f: magnetic field application unit
2, 203: detector
3, 302, 303, 304: electronic circuit (determiner)
11a, 11b, 11e, 11f, 11g, 11h, 11i, 11j, 11k, 11l, 11m, 11n: first magnetic field application unit
12a, 12b, 12e, 12f, 12g, 12h, 12i, 12j, 12k, 12l, 12m, 12n: second magnetic field application unit
14y: yoke (magnetic field application unit)
21, 21a, 21b, 21c, 21d, 21e, 21f, 21g, 21h, 210: excitation coil
22, 22a, 22b, 22c, 22d, 22e, 22f, 22g, 22h, 22i, 22j, 22k, 220, 221, 224: detection coil
23: magnetic sensor element
44: coil portion (magnetic field application unit, excitation coil)

100, 200, 300: inspection apparatus (magnetic body inspection apparatus)
900: mobile X-ray imaging apparatus (X-ray imaging apparatus)
901: stationary X-ray irradiation apparatus (X-ray imaging apparatus)
902: stand-type X-ray irradiation apparatus (X-ray imaging apparatus)
903: stand-type X-ray detection apparatus (X-ray imaging apparatus)
E1, E11, E12: X-ray irradiator
E2, E23: X-ray detector
Th: predetermined threshold
Th1: predetermined first threshold
Th2: predetermined second threshold
M: predetermined number of times
W: steel wire rope (magnetic body, long material, wire)

The invention claimed is:

1. A magnetic body inspection apparatus comprising:
a magnetic field application unit configured to apply a magnetic field to a magnetic body made of an elongated material to be inspected so that a magnetization direction of the magnetic body is adjusted;
a detector configured to output a detection signal in accordance with a magnetic field of the magnetic body or a variation in the magnetic field of the magnetic body; and
a determiner configured to determine a magnetic state of the magnetic body based on the detection signal output from the detector; wherein
the magnetic body has a central axis;
the magnetic field application unit and the detector are arranged in parallel with each other along the central axis;
the detector includes a detection coil wound around the central axis of the magnetic body.

2. The magnetic body inspection apparatus according to claim 1, wherein
the magnetic field application unit is configured to apply a magnetic field in a first direction to the magnetic body to be inspected so that the magnetization direction of the magnetic body is adjusted;
the detector is configured to detect at least one of a magnetic field of the magnetic body in a second direction that intersects with a first direction and a variation in the magnetic field of the magnetic body in the second direction, and to output a detection signal in accordance with the magnetic field of the magnetic body in the second direction or the variation in the magnetic field of the magnetic body in the second direction, which has been detected; and
the determiner is configured to determine the magnetic state of the magnetic body based on the detection signal output from the detector.

3. The magnetic body inspection apparatus according to claim 2, wherein
the magnetic field application unit is configured to apply a magnetic field in a direction that intersects with a longitudinal direction of the elongated material; and
the detector is configured to detect a magnetic field of the magnetic body made of the elongated material in the second direction or a variation in the magnetic field of the magnetic body made of the elongated material in the second direction.

4. The magnetic body inspection apparatus according to claim 3, wherein the magnetic field application unit is spaced apart from the detector in the second direction in which the elongated material extends such that a magnetic field output therefrom does not affect detection by the detector.

5. The magnetic body inspection apparatus according to claim 4, wherein the magnetic field application unit includes a first magnetic field application unit configured to apply a magnetic field in the first direction to the magnetic body made of the elongated material, and a second magnetic field application unit provided on a side of the detector opposite to the first magnetic field application unit in the second direction and configured to apply a magnetic field in a direction parallel to a plane that intersects with the second direction to the magnetic body made of the elongated material.

6. The magnetic body inspection apparatus according to claim 3, wherein the detection coil is configured to detect the variation in the magnetic field of the magnetic body in the second direction and to generate the detection signal.

7. The magnetic body inspection apparatus according to claim 6, wherein
the detection coil includes a differential coil; and
the determiner is configured to determine the magnetic state of the magnetic body made of the elongated material based on a difference between magnitudes of detection signals generated by two coil portions included in the differential coil due to the magnetic field in the second direction.

8. The magnetic body inspection apparatus according to claim 1, wherein the determiner is configured to output one or more threshold signals indicating that the detection signal output from the detector exceeds one or more predetermined thresholds when the detection signal exceeds the one or more predetermined thresholds.

9. The magnetic body inspection apparatus according to claim 8, wherein
the predetermined thresholds include a first threshold and a second threshold, which is larger than the first threshold; and
the determiner is configured to output a first threshold signal indicating that the detection signal output from the detector exceeds the first threshold when the detection signal exceeds the first threshold, and to output a second threshold signal indicating that the detection signal output from the detector exceeds the second threshold when the detection signal exceeds the second threshold.

10. The magnetic body inspection apparatus according to claim 1, wherein the determiner is configured to count a number of times the detection signal output from the detector exceeds one or more predetermined thresholds, and to output a signal indicating that the number of times that has been counted exceeds a predetermined number of times when the number of times that has been counted exceeds the predetermined number of times.

11. The magnetic body inspection apparatus according to claim 3, wherein the detector further includes an excitation coil configured to excite a magnetization state of the magnetic body, and is configured to detect a magnetic field in the second direction of the magnetic body, the magnetization state of which has been excited due to a magnetic field generated by an excitation current that flows through the excitation coil, or a variation in the magnetic field in the second direction of the magnetic body.

12. The magnetic body inspection apparatus according to claim 11, wherein the magnetic field applied to the magnetic body by the magnetic field application unit is larger than the magnetic field generated by the excitation coil to excite the magnetization state of the magnetic body.

13. The magnetic body inspection apparatus according to claim 3, wherein the detector is configured to detect the magnetic field of the magnetic body in the second direction at a detection position of the detector or the variation in the magnetic field of the magnetic body in the second direction at the detection position of the detector when the magnetic body is moved relative to the detector in the second direction.

14. The magnetic body inspection apparatus according to claim 2, wherein
the magnetic body includes a wire configured to move at least one of an X-ray irradiator configured to irradiate a subject with X-rays and an X-ray detector configured to detect the X-rays transmitted through the subject, both of which are provided in an X-ray imaging apparatus and are movable relative to the subject; and
the detector is configured to detect a magnetic field of the wire in the second direction.

15. A magnetic body inspection method comprising:
applying a magnetic field to a magnetic body made of an elongated material to be inspected, and adjusting a magnetization direction of the magnetic body;
detecting a magnetic field of the magnetic body or a variation in the magnetic field of the magnetic body, and outputting a detection signal in accordance with the magnetic field of the magnetic body or the variation in the magnetic field of the magnetic body that has been detected; and
determining a magnetic state of the magnetic body based on the detection signal that has been output; wherein
the outputting of the detection signal includes outputting the detection signal generated by a detection coil wound around a central axis of the magnetic body.

16. The magnetic body inspection apparatus according to claim 1, wherein the detection coil includes a cylindrical coil in which two semi-cylindrical coil portions are combined with each other.

17. The magnetic body inspection apparatus according to claim 1, wherein
the detector further includes an excitation coil configured to excite a magnetization state of the magnetic body, and
the magnetic field application unit and the excitation coil are arranged so that the magnetic field application unit applies a magnetic field to a region of the magnetic body while the excitation coil is remote from the region such that the magnetic body must be moved relative to the magnetic body inspection apparatus for the excitation coil to excite a magnetization state of the region of the magnetic body.

18. The magnetic body inspection method of claim 15, further comprising:
moving the magnetic body relative to the magnetic body inspection apparatus, wherein
the moving the magnetic body relative to the magnetic body inspection apparatus is performed after applying a magnetic field to the magnetic body, and
the moving the magnetic body relative to the magnetic body inspection apparatus is performed before detecting a magnetic field of the magnetic body.

* * * * *